(12) United States Patent
Ugajin

(10) Patent No.: US 10,878,669 B2
(45) Date of Patent: Dec. 29, 2020

(54) STORE SERVER, STORE SYSTEM AND CONTROL METHOD OF STORE SYSTEM

(71) Applicant: TOSHIBA TEC KABUSHIKI KAISHA, Tokyo (JP)

(72) Inventor: Tomoyuki Ugajin, Izunokuni Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/504,048

(22) Filed: Jul. 5, 2019

(65) Prior Publication Data
US 2020/0202684 A1  Jun. 25, 2020

(30) Foreign Application Priority Data
Dec. 25, 2018  (JP) ................................ 2018-241665

(51) Int. Cl.
*G06Q 20/20* (2012.01)
*G07G 1/14* (2006.01)
*B62B 3/14* (2006.01)

(52) U.S. Cl.
CPC ............. *G07G 1/14* (2013.01); *B62B 3/1424* (2013.01); *G06Q 20/202* (2013.01); *G06Q 20/209* (2013.01)

(58) Field of Classification Search
CPC ...... G07G 1/14; G06Q 20/202; G06Q 20/209; B62B 3/1424
USPC ....................................................... 235/383
See application file for complete search history.

(56) References Cited

U.S. PATENT DOCUMENTS

| 9,619,976 B2 | 4/2017 | Sambe | |
| 2013/0282460 A1 | 10/2013 | Brosnan et al. | |
| 2014/0164193 A1 | 6/2014 | Ando et al. | |
| 2015/0088642 A1* | 3/2015 | Mathew | G06Q 30/0631 705/14.51 |
| 2017/0158215 A1* | 6/2017 | Phillips | G07G 1/0081 |

FOREIGN PATENT DOCUMENTS

EP  3043305 A1  7/2016

OTHER PUBLICATIONS

Extended European Search Report dated Mar. 20, 2020, mailed in counterpart European Application No. 19190453.1, 10 pages.

* cited by examiner

*Primary Examiner* — Daniel A Hess
(74) *Attorney, Agent, or Firm* — Kim & Stewart LLP

(57) ABSTRACT

In one embodiment, a store server has a communication device, a storage device, and a processor. The communication device performs transmission/reception of information with an information terminal and an electronic device. The storage device stores a list of terminal identification data in which first terminal identification data unique to the information terminal and second terminal identification data unique to the electronic device are to be registered, and a shopping file in which information of the commodity to be identified by identification data of the commodity is to be registered in association with at least any one of the first terminal identification data and the second terminal identification data. The processor creates the shopping file in association with at least any one of the first terminal identification data and the second terminal identification data.

10 Claims, 16 Drawing Sheets

| MEMBER ID | | |
|---|---|---|
| TERMINAL ID (1) | TERMINAL ID (2) | TERMINAL ID (3) |
| PERCHASED COMMODITY INFORMATION | PERCHASED COMMODITY INFORMATION | PERCHASED COMMODITY INFORMATION |

Fig.15

| MEMBER ID (1) | MEMBER ID (2) | |
|---|---|---|
| TERMINAL ID (1) | TERMINAL ID (2) | TERMINAL ID (3) |
| PERCHASED COMMODITY INFORMATION | PERCHASED COMMODITY INFORMATION | PERCHASED COMMODITY INFORMATION |

Fig.16

STORE SERVER, STORE SYSTEM AND CONTROL METHOD OF STORE SYSTEM

CROSS-REFERENCE TO RELATED APPLICATION

This application is based upon and claims the benefit of priority from the prior Japanese Patent Application No. 2018-241665, filed on Dec. 25, 2018, the entire contents of which are incorporated herein by reference.

FIELD

Embodiments described herein relate generally to a store server, a store system and a control method of a store system in a store such as a general merchandising store.

BACKGROUND

At present, a general merchandising store has various problems such as labor shortage and management of dedicated devices, and thereby attempts to the countermeasure, such as introduction of a self-register and a semi-self-register, and POS (Point of Sales) less service have been advanced. There is a cart POS system, as one of them.

The cart POS system uses a cart on which a customer loads a commodity to be purchased, that is a so-called shopping cart. A dedicated information terminal provided with a scanner and so on is attached to the shopping cart. The information terminal accepts an operation for login authentication. When the login is approved, the information terminal is started, and becomes able to input information of the commodity which the customer purchases, for example. That is, in the cart POS system, the customer who does shopping using a shopping cart performs a registration operation of the commodity to be purchased. Therefore, according to the cart POS system, load of an employee performing a register input operation at the store side can be reduced, and thereby reduction of personnel can be achieved.

However, in the present cart POS system, a system is used in which an information terminal that is a dedicated device is prepared at the store side and is lent to a customer. Accordingly, it is effective to reduction of the members performing the register input operation, but a problem that the information terminal may be possibly stolen, a problem of management such as maintenance of the information terminal, and so on are generated.

In addition, when a customer uses the cart POS system, it is necessary for the customer to use a shopping cart attached with an information terminal. In addition, after having finished the shopping, the customer has to return the shopping cart to a designated place in the store. For example, when a customer visits the store by a customer's own car, the customer borrows a shopping cart from a cart storage space provided near a car parking lot and does shopping. And after having finished shopping, the customer carries the shopping cart to the customer's own car while placing the baggage (the purchased commodity) on the shopping cart. In a case like this, the customer cannot leave the shopping cart at the above-described cart storage space. That is, the customer has to return the shopping cart, not to the above-described cart storage space, but to the above-described designated place. For the reason, the customer feels it to be troublesome to return the shopping cart.

BRIEF DESCRIPTION OF THE DRAWINGS

FIG. 15 is a diagram showing an example in which shopping files corresponding to a plurality of the electronic devices according to the embodiment are associated.

FIG. 16 is a diagram showing an example in which shopping files corresponding to the information terminal and the electronic devices according to the embodiment are associated.

DETAILED DESCRIPTION

Figure 1:
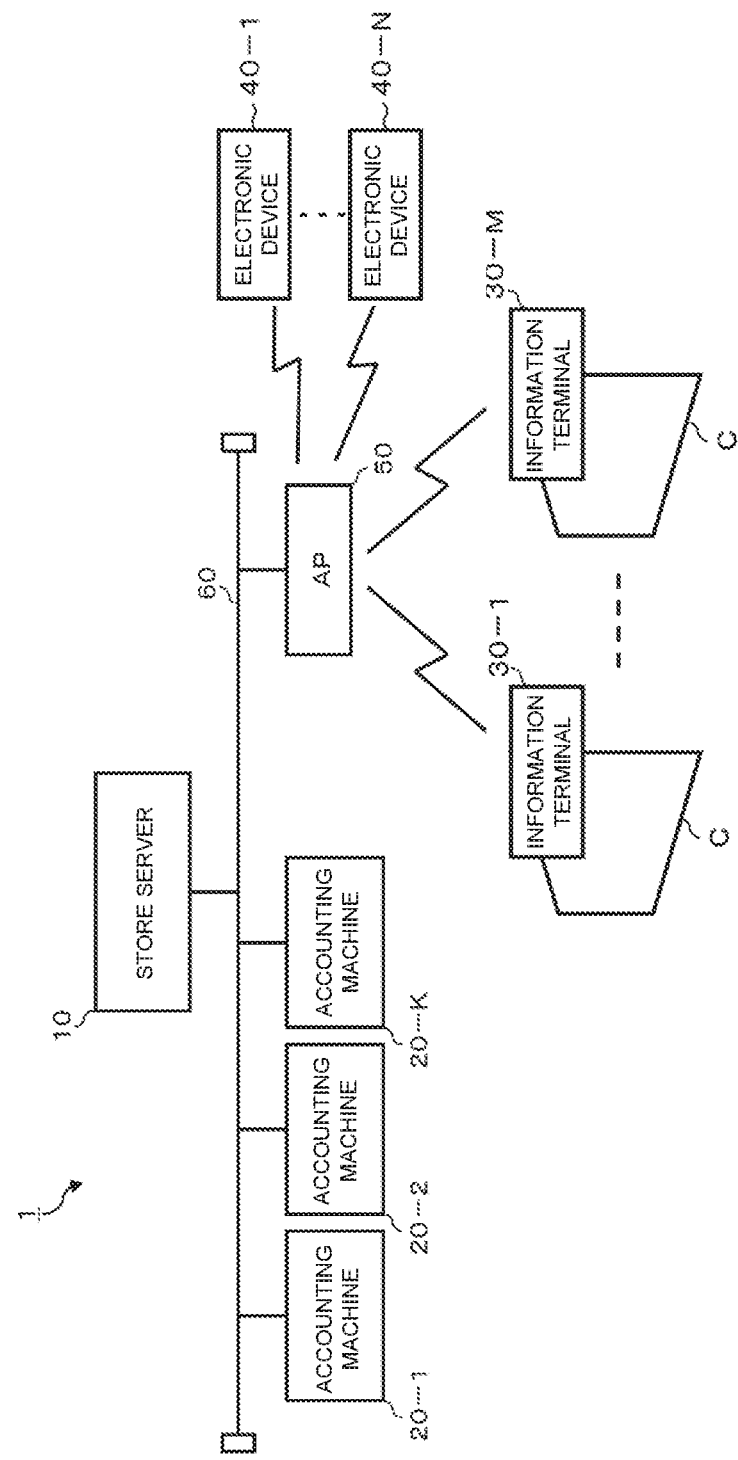
FIG. 1 is a whole configuration diagram of a store system according to an embodiment.

According to one embodiment, a store server controls an information terminal which is provided in a store and inputs identification data of a commodity for identifying the commodity which a customer purchases in the store, and an electronic device which the customer oneself possesses and uses for inputting the identification data of the commodity. The store server has a communication device, a storage device, and a processor. The communication device performs transmission/reception of information with the information terminal and the electronic device. The storage device stores a list of terminal identification data in which first terminal identification data unique to the information terminal is to be previously registered and second terminal identification data unique to the electronic device to be issued when the customer uses the electronic device is to be additionally registered. The storage device further stores a shopping file in which information of the commodity to be identified by the identification data of the commodity is to be registered in association with at least any one of the first terminal identification data and the second terminal identification data. When the first terminal identification data is received from the information terminal by the communication device, the processor determines whether first terminal identification data coincident with the received first terminal identification data is registered in the list of the terminal identification data. When determining that the coincident first terminal identification data is registered in the list of the terminal identification data, the processor creates the shopping file in association with the received first terminal identification data. When the second terminal identification data is received from the electronic device by the communication device, the processor determines whether second terminal identification data coincident with the received second terminal identification data is registered in the list of the terminal identification data. When determining that the coincident second terminal identification data is registered in the list of the terminal identification data, the processor creates the shopping file in association with the received second terminal identification data.

Hereinafter, embodiments of the present invention will be described with reference to the drawings. In the drawings, the same symbols indicate the same or the similar portions.

FIG. 1 is a whole configuration diagram of a store system 1 of the present embodiment. The store system 1 is a system to realize a cart POS system. As shown in FIG. 1, the store system 1 includes a store server 10, a plurality of accounting machines 20 (20-1, . . . , 20-K), and a plurality of information terminals 30 (30-1, . . . , 30-M). The information terminal 30 is provided on a shopping cart C (hereinafter, abbreviated as a cart C). That is, the information terminals 30 are respectively provided on a plurality of the carts C. The cart C is an example of a hand truck which a customer who is a user of the cart C carries while loading a commodity which the customer purchases thereon.

The store system 1 in the present embodiment can further incorporate electronic devices 40 (40-1, . . . , 40-N) which customers possess. The electronic device 40 executes a cart POS program described later, and thereby operates similarly as the information terminal 30. The electronic device 40 is a smartphone, a portable telephone, a personal computer, a tablet terminal, a portable game terminal, and so on, for example.

As shown in FIG. 1, the store server 10, the accounting machines 20, an access point (AP) 50 are connected to a network 60 such as a LAN (Local Area Network). The information terminal 30 has a wireless unit. The information terminal 30 performs wireless communication with the access point 50. The access point 50 relays communication between the respective devices connected to the network 60, namely, the store server 10 and the accounting machine 20, and the information terminal 30. In FIG. 1, only one access point 50 is shown, but two or more access points 50 may be provided depending on the scale of the store, and so on.

In addition, when incorporated in the store system 1, the electronic device 40 performs wireless communication with the access point 50, in the same manner as the information terminal 30. In this case, the store server 10 and the accounting machine 20 deal with the electronic device 40 connected via the access point 50 in the same manner as the information terminal 30.

The information terminal 30 is a device to accept an operation of a customer oneself for inputting information and so on of a commodity which the customer purchases. Unique first terminal identification data are respectively assigned to a plurality of the information terminals 30, in order to identify the respective information terminals 30. In the following description, the first terminal identification data is sometimes simply called a terminal ID. The plurality of information terminals 30 are managed by the store server 10, using the respective terminal IDs. The accounting machine 20 is a device to accept an operation of the customer oneself for performing accounting of the commodity which the customer purchases. That is, the store system 1 is a store system of a self-service system in which the customer oneself performs from information input of the commodity to be purchased to accounting thereof.

The electronic device 40 is used for accepting an operation of a customer oneself for inputting information and so on of a commodity, in place of the information terminal 30, for example. The electronic device 40 accepts an operation by a customer to execute a cart POS program. The electronic device 40 executes the cart POS program to execute the same operation as the information terminal 30 in the store system 1. In addition, the electronic device 40 is used in place of the information terminal 30, and in addition, it is used together with the information terminal 30, and thereby can accept information input and so on of the commodity. Also in this case, the customer can collectively perform accounting in the accounting machine 20.

A plural number (K, for example) of the accounting machines 20 are installed in a store, for example. In addition, at least one accounting machine 20 may be installed in a store.

The store server 10 controls the respective information terminals 30. The store server 10 creates list data of the commodities which a customer purchases from the information of the commodities inputted by the information terminal 30. The store server 10 identifies a customer who uses the accounting machine 20, and transmits the list data of the commodities which the customer has purchased to the accounting machine 20 which the customer uses for accounting. The store server 10 functions as a terminal control device to control the information terminals 30.

In addition, when receiving a registration request from the electronic device 40 to the store system 1, the store server 10 issues second terminal identification data to be temporarily used, and assigns the above-described issued second terminal identification data to the electronic device 40 which has performed the registration request. Hereinafter, the second terminal identification data is called an additional terminal ID, or simply called a terminal ID. The store server 10 deals with the electronic device 40 assigned with the additional terminal ID in the same manner as the information terminal 30.

In addition, in the present embodiment, the store server 10 issues the terminal ID to be temporarily used in response to the registration request from the electronic device 40 and assigns it to the electronic device 40, but a customer may previously register the electronic device 40 which the customer uses for registration of a commodity in the store. For example, the electronic device 40 executes a cart POS program (described later) to issue a terminal ID unique to the electronic device 40. And the electronic device 40 can previously register the terminal ID in the store server 10 as member information of the customer.

Figure 2:
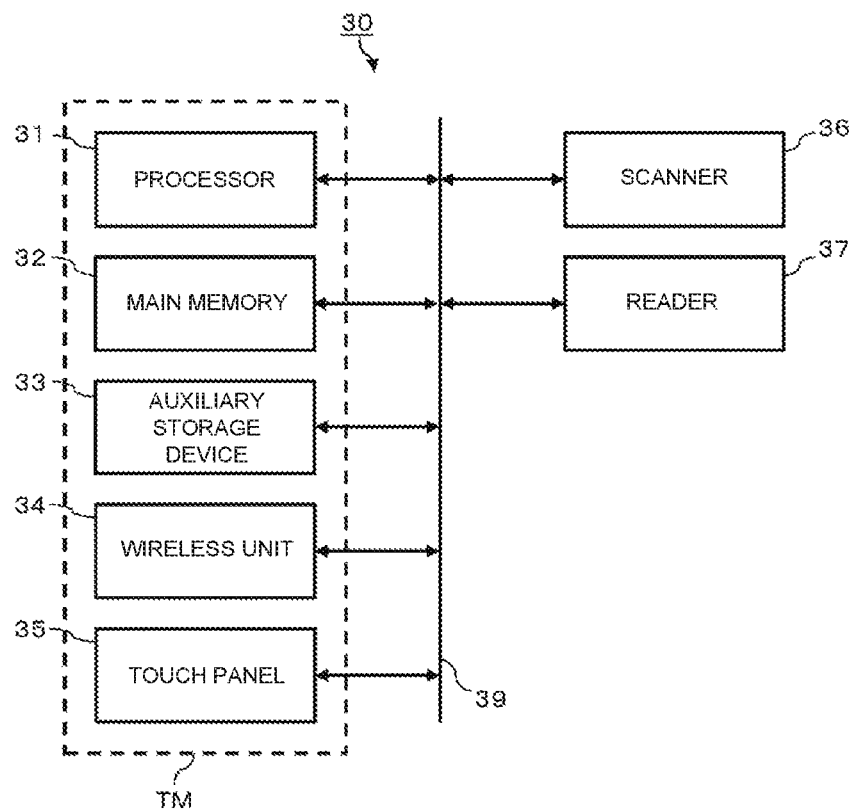
FIG. 2 is a block diagram showing a circuit configuration of a main portion of the information terminal according to the embodiment.

FIG. 2 is a block diagram showing a circuit configuration of a main portion of the information terminal 30. As shown in FIG. 2, the information terminal 30 has a processor 31, a main memory 32, an auxiliary storage device 33, a wireless unit 34, a touch panel 35, a scanner 36, a reader 37, and a system transmission path 39. The system transmission path 39 includes an address bus, a data bus, a control signal line, and so on. In the information terminal 30, the processor 31, the main memory 32, the auxiliary storage device 33, the wireless unit 34, the touch panel 35, the scanner 36, and the reader 37 are connected to the system transmission path 39.

In the information terminal 30, a computer is configured by the processor 31, the main memory 32 and the auxiliary storage device 33, and the system transmission path 39 connecting these.

The processor 31 corresponds to a center portion of the computer.

The processor 31 controls the respective portions so as to execute various functions as the information terminal 30, in accordance with an operating system or an application program. The processor 31 is a CPU (Central Processing Unit), for example.

The main memory 32 corresponds to a main storage portion of the computer. The main memory 32 includes a nonvolatile memory area and a volatile memory area. The main memory 32 stores the operating system or the application program in the nonvolatile memory area. The main memory 32 may store data which is necessary when the processor 31 executes a processing for controlling the respective portions, in the nonvolatile or the volatile memory area. The main memory 32 uses the volatile memory area as a work area in which data is arbitrarily rewritten by the processor 31. The nonvolatile memory area is a ROM (Read Only Memory), for example. The volatile memory area is a RAM (Random Access Memory), for example.

The auxiliary storage device 33 corresponds to an auxiliary storage portion of the computer. The auxiliary storage device 33 is a device such as an HDD (Hard Disc Drive), or an SSD (Solid State Drive), for example. The auxiliary storage device 33 stores data which the processor 31 uses when performing various processings, data which has been created by the processing of the processor 31, or the like. The auxiliary storage device 33 may also store the above-described application program.

The wireless unit 34 performs wireless communication with the access point 50, in accordance with a wireless communication protocol.

The touch panel 35 is a device which is provided with both of an input device and a display device of the information terminal 30. The touch panel 35 detects a touch position on a displayed image, and outputs its touch position information to the processor 31.

The scanner 36 reads a code symbol attached to a commodity, such as a bar code, a two-dimensional data code. The scanner 36 outputs data of the read code symbol to the processor 31. The data of the code symbol is a commodity ID described later which the code symbol indicates, for example. The scanner 36 may be of a type to read a code symbol by being scanned with a laser light, and may be of a type to read a code symbol from an image imaged by an imaging device.

The reader 37 reads data recorded in a recording medium, and outputs the read data to the processor 31. The reader 37 is a magnetic card reader when the recording medium is a magnetic card, and is an IC card reader when the recording medium is a contact-type IC card, for example. In addition, when the recording medium is a recording medium using noncontact communication, such as a noncontact-type IC card or a smartphone, a noncontact-type reader is used as the reader 37.

The storage medium includes a member card. In the present embodiment, a customer to use the store system 1 is required to perform member registration in advance. A unique member ID is assigned to the customer who has performed member registration, as identification data of the customer for identifying the customer, and a member card recorded with the member ID is issued to the customer. The reader 37 is able to read the member ID (the identification data of the customer) recorded in the member card. That is, the reader 37 functions as a reading device for reading the identification data of the customer who uses a cart C, that is the member ID. In addition, the member ID may be recorded in the member card as electronic data, or may be recorded on the member card in a form of printing of a code symbol such as a bar code.

In the information terminal 30 described above, the processor 31, the main memory 32, the auxiliary storage device 33, the wireless unit 34 and the touch panel 35 are included in a tablet terminal TM, for example. That is, the information terminal 30 has the tablet terminal TM and the scanner 36 and the reader 37 which are electrically connected to the tablet terminal TM.

Figure 3:
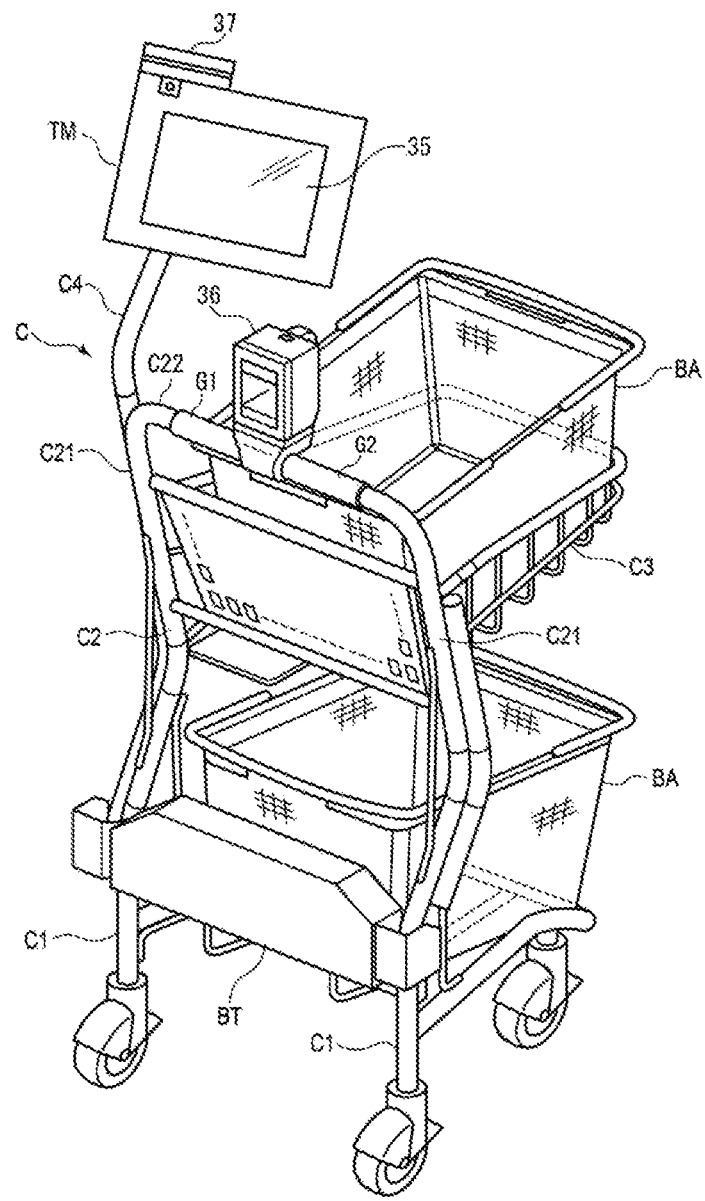
FIG. 3 is a perspective view showing an example of the cart provided with the information terminal according to the embodiment.

FIG. 3 is a perspective view showing an example of the cart C provided with the information terminal 30. As shown in FIG. 3, the cart C has a caster portion C1 for movement, a handle frame portion C2, and a basket receiving portion C3. The caster portion C1 has four wheels for making the cart C move smoothly on the floor surface. The handle frame portion C2 includes a pair of vertical frames C21, C21 each erected at the rear wheel side of the caster portion C1, and a handle bar C22 to couple the upper ends of these vertical frames C21, C21. The basket receiving portion C3 is provided projecting from a halfway portion of the handle frame portion C2 toward a forward direction. The forward direction is a direction in which the cart C moves when a customer pushes the cart C while holding the handle bar C22. In the cart C, the customer can place a shopping basket BA for housing a commodity on each of the basket receiving portion C3 and the caster portion C1.

As shown in FIG. 3, the scanner 36 is provided at a halfway portion of the handle bar C22. The scanner 36 is attached to the handle bar C22 so that a reading window is positioned at a front side. The front side is a side at which the customer who pushes the cart C while holding the handle bar C22 stands.

As shown in FIG. 3, a pole C4 is attached to the vertical frame C21 at one side. The pole C4 has a tip which is positioned above the handle bar C22. The tablet terminal TM is attached to the tip portion of the pole C4 so that a screen of the touch panel 35 is headed for the front side. The reader 37 is attached to the tablet terminal TM so that a card slit is positioned at the front side. In FIG. 3, the reader 37 is a magnetic card reader. A battery BA is attached to a lower end side of the handle frame portion C2 across the vertical frames C21, C21. The battery BT is a power source for driving the tablet terminal TM and the scanner 36.

Grips G1, G2 are mounted on the handle bar C22 so as to cover the outer circumferences of the right and left bars across the scanner 36, respectively. The grips G1, G2 are ones which the customer holds for moving the cart C.

Figure 4:
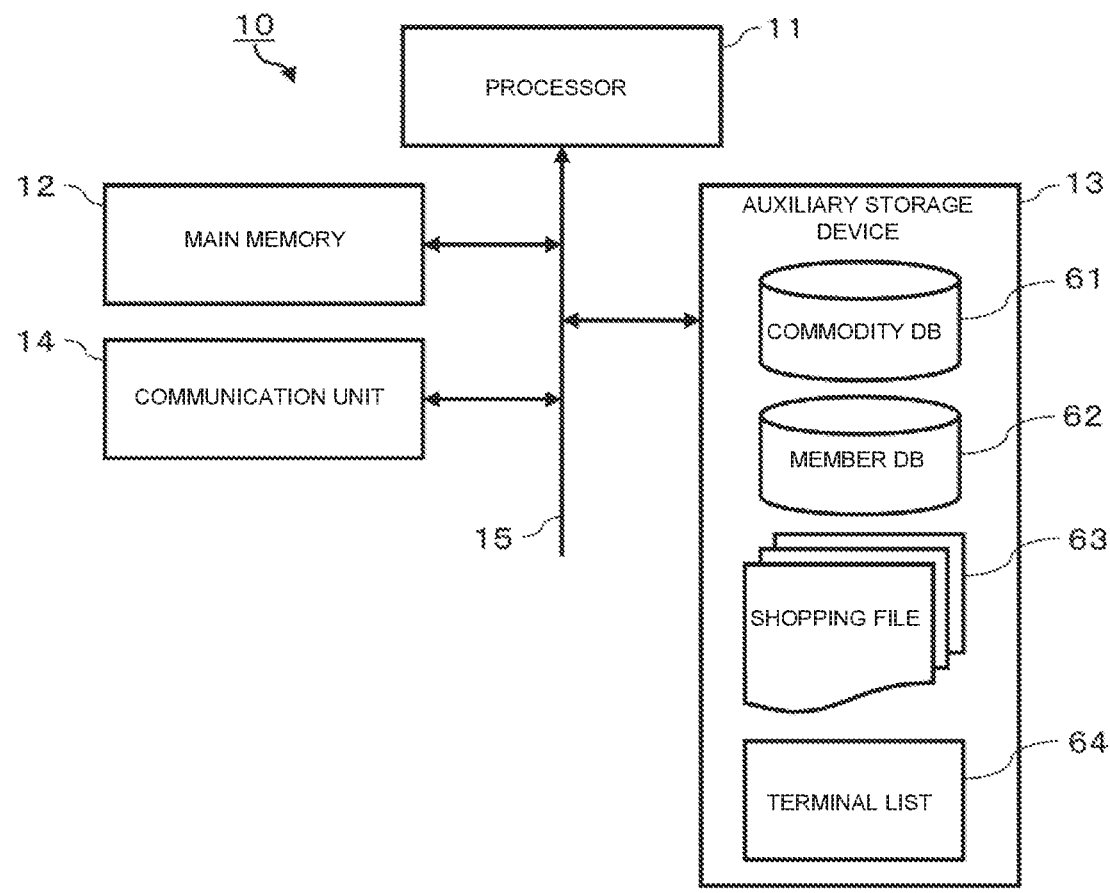
FIG. 4 is a block diagram showing a circuit configuration of a main portion of the store server according to the embodiment.

FIG. 4 is a block diagram showing a circuit configuration of a main portion of the store server 10. The store server 10 has a processor 11, a main memory 12, an auxiliary storage device 13, a communication unit 14 and a system transmission path 15. The system transmission path 15 includes an address bus, a data bus, a control signal line, and so on. In the store server 10, the processor 11, the main memory 12, the auxiliary storage device 13 and the communication unit 14 are connected to the system transmission path 15. In the store server 10, a computer is configured by the processor 11, the main memory 12 and the auxiliary storage device 13, and the system transmission path 15 connecting these.

The processor 11 corresponds to a center portion of the computer. The processor 11 controls the respective portions so as to execute various functions as the store server 10, in accordance with an operating system or an application program. The processor 11 is a CPU, for example.

The main memory 12 corresponds to a main storage portion of the computer. The main memory 12 includes a nonvolatile memory area and a volatile memory area. The main memory 12 stores the operating system or the application program in the nonvolatile memory area. The main memory 12 may store data which is necessary when the processor 11 executes a processing for controlling the respective portions, in the nonvolatile or the volatile memory area. The main memory 12 uses the volatile memory area as a work area in which data is arbitrarily rewritten by the processor 11. The nonvolatile memory area is a ROM, for example. The volatile memory area is a RAM, for example.

The auxiliary storage device 13 corresponds to an auxiliary storage portion of the computer. The auxiliary storage device 13 is a device such as an HDD, or an SSD, for example. The auxiliary storage device 13 stores data which the processor 11 uses when performing various processings, data which has been created by the processing of the processor 11, or the like. The auxiliary storage device 13 may also store the above-described application program.

The communication unit 14 performs data communication with the accounting machine 20, the information terminal 30 or the electronic device 40 which is to be connected via the network 60, in accordance with a communication protocol.

In the store server 10 described above, a commodity database 61 and a member database 62 are stored in the auxiliary storage device 13. In addition, the auxiliary storage device 13 has an area for storing a plurality of shopping files 63, and an area for storing a terminal list 64 for registering terminal IDs of the information terminals 30 and the electronic devices 40 which are used in the store.

Commodity data records each of which is created for each of commodities to be sold in the store are registered in the commodity database 61. The commodity data record includes items of a commodity ID, a commodity name, a price, and so on. The commodity ID is unique identification data which is set for each commodity for individually identifying each commodity. The commodity name and the price are a name of the commodity to be identified by the commodity ID (the identification data of the commodity), and a sales price for the each commodity.

The member database 62 stores a member data record 62R which is created for each of the customers which have performed member registration in order to use the store system 1.

In the terminal list 64, a terminal ID unique to the existing information terminal 30 attached to the cart C, and an additional terminal ID issued in response to the registration request from the electronic device 40 are registered.

Figure 5:
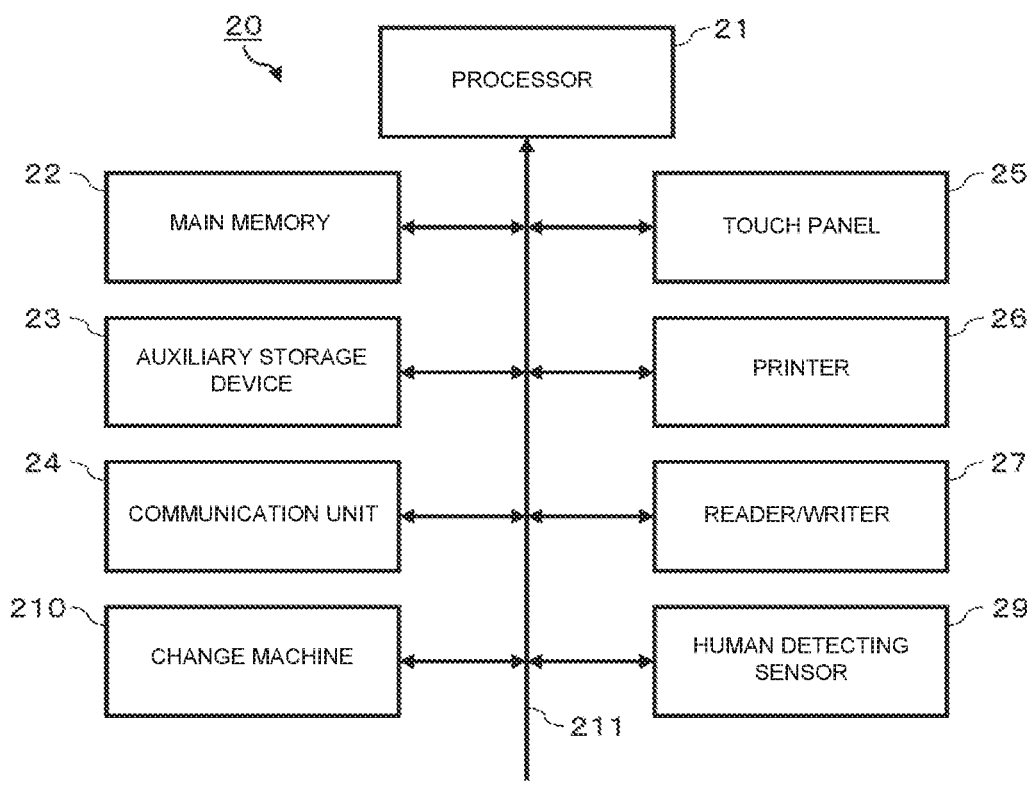
FIG. 5 is a block diagram showing a circuit configuration of a main portion of the accounting machine according to the embodiment.

FIG. 5 is a block diagram showing a circuit configuration of a main portion of the accounting machine 20. The accounting machine 20 has a processor 21, a main memory 22, an auxiliary storage device 23, a communication unit 24, a touch panel 25, a printer 26, a reader/writer 27, a human detecting sensor 29, a change machine 210 and a system transmission path 211. The system transmission path 211 includes an address bus, a data bus, a control signal line, and so on. In the accounting machine 20, the processor 21, the main memory 22, the auxiliary storage device 23, the communication unit 24, the touch panel 25, the printer 26, the reader/writer 27, and the human detecting sensor 29 are connected to the system transmission path 211. In the accounting machine 20, a computer is configured by the processor 21, the main memory 22 and the auxiliary storage device 23, and the system transmission path 211 connecting these.

The processor 21 corresponds to a center portion of the computer. The processor 21 controls the respective portions so as to execute various functions as the accounting machine 20, in accordance with an operating system or an application program. The processor 21 is a CPU, for example.

The main memory 22 corresponds to a main storage portion of the computer. The main memory 22 includes a nonvolatile memory area and a volatile memory area. The main memory 22 stores the operating system or the application program in the nonvolatile memory area. The main memory 22 may store data which is necessary when the processor 21 executes a processing for controlling the respective portions in the nonvolatile or the volatile memory area. The main memory 22 uses the volatile memory area as a work area in which data is arbitrarily rewritten by the processor 21. The nonvolatile memory area is a ROM, for example. The volatile memory area is a RAM, for example.

The auxiliary storage device 23 corresponds to an auxiliary storage portion of the computer. The auxiliary storage device 23 is a device such as an HDD, or an SSD, for example. The auxiliary storage device 23 stores data which the processor 21 uses when performing various processings, data which has been created by the processing of the processor 21, or the like. The auxiliary storage device 23 may also store the above-described application program.

The communication unit 24 performs data communication with the store server 10 to be connected via the network 60 in accordance with a communication protocol.

The touch panel 25 is a device which is provided with both of an input device and a display device of the accounting machine 20. The touch panel 25 detects a touch position on a displayed image, and outputs its touch position information to the processor 21.

The printer 26 prints various character strings, an image, or the like on a receipt sheet to issue a receipt. A thermal printer, a dot impact printer, or the like can be used as the printer 26 of this kind.

The reader/writer 27 reads data recorded in a recording medium, and writes data into the above-described recording medium. The reader/writer 27 may be a reader/writer of a contact-type, and may be a reader/writer of a noncontact-type. The recording medium is a settlement card, such as a credit card, a debit card, an electronic money card, a prepaid card. A wireless communication device, such as a smartphone, having the same function as the settlement card may be used as the recording medium.

The human detecting sensor 29 detects whereabouts of a person standing in front of the accounting machine 20, using infrared rays, ultrasonic sound, or the like, for example. When detecting the whereabouts of a person, the human detecting sensor 29 is turned on.

The change machine 210 receives a coin and a bill to be inputted therein. In addition, the change machine 210 discharges a coin and a bill as the change.

Accounting machine IDs assigned to the respective accounting machines 20 for individually identifying the accounting machines 20 are set to a plurality of the accounting machines 20 described above. The accounting machine ID is stored in the auxiliary storage device 23, for example.

Figure 6:
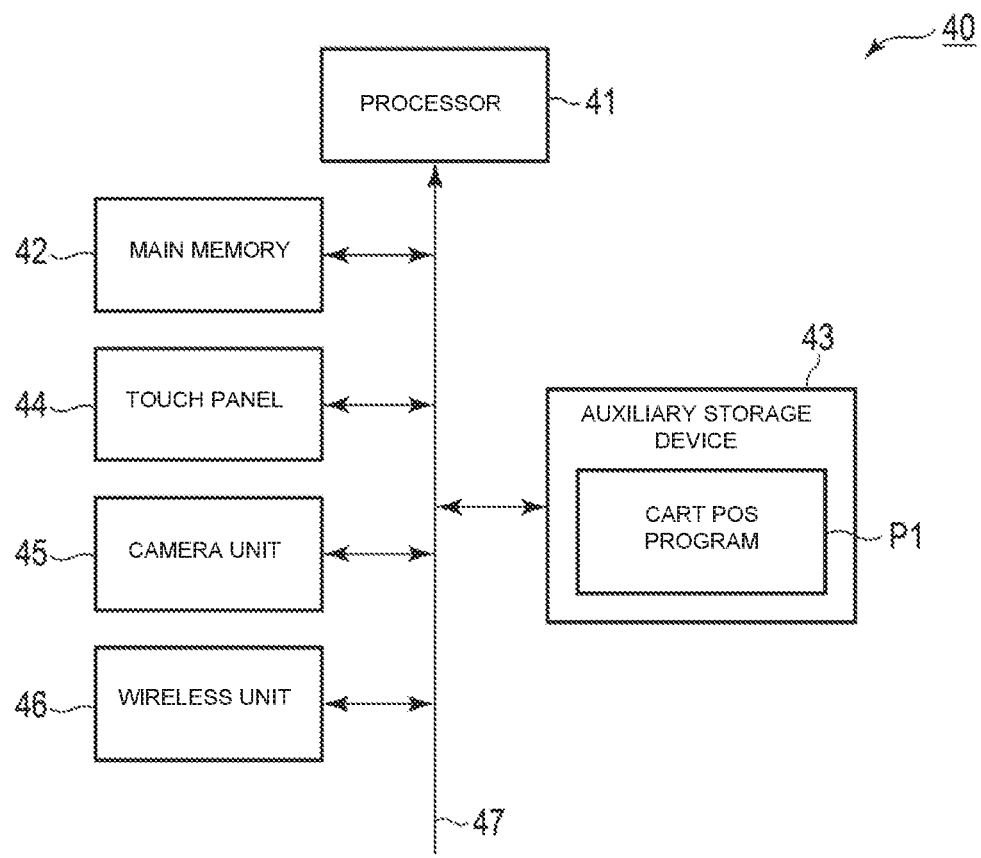
FIG. 6 is a block diagram showing a configuration of a main portion of the electronic device according to the embodiment.

FIG. 6 is a block diagram showing a configuration of a main portion of the electronic device 40. The electronic device 40 has a processor 41, a main memory 42, an auxiliary storage device 43, a touch panel 44, a camera unit 45, a wireless unit 46, and so on. The processor 41, the main memory 42, the auxiliary storage device 43, the touch panel 44, the camera unit 45 and the wireless unit 46 are connected by a system transmission path 47 including an address bus, a data bus, a control signal line, and so on.

In the electronic device 40, a computer is configured by the processor 41, the main memory 42 and the auxiliary storage device 43, and the system transmission path 47 connecting these.

The processor 41 corresponds to a center portion of the computer. The processor 41 controls the respective portions so as to execute various functions as the electronic device 40, in accordance with an operating system and an application program.

The main memory 42 corresponds to a main storage portion of the computer. The main memory 42 includes a nonvolatile memory area and a volatile memory area. The main memory 42 stores the operating system and the application program in the nonvolatile memory area. In addition, the main memory 42 may store data which is necessary when the processor 41 executes a processing for controlling the respective portions in the nonvolatile or the volatile memory area. The main memory 42 uses the volatile memory area as a work area in which data is arbitrarily rewritten by the processor 41.

The auxiliary storage device 43 corresponds to an auxiliary storage portion of the computer. The auxiliary storage device 43 is a device such as an HDD, or an SSD, for example. The auxiliary storage device 43 stores data which the processor 41 uses in the various processings, or data which has been generated by the processing of the processor 41. The auxiliary storage device 43 may also store the application program.

The touch panel 44 functions as an input device and a display device of the electronic device 40. An icon for starting the application program is displayed on the touch panel 44.

The camera unit 45 photographs a bar code attached to a commodity, in order to read a code symbol (a bar code, for example) attached to the commodity for identifying the commodity, in place of the scanner 36 of the above-described information terminal 30. The camera unit 45 has a resolution capable of photographing the bar code attached to the commodity. The wireless unit 46 performs transmission/reception of data with the access point 50 using wireless communication. An information processing device incorporating the camera unit 45 and the wireless unit 45, out of a portable information processing device such as a smartphone, a portable telephone, a tablet terminal can be used as the electronic device 40 in the store system 1 (the cart POS system).

When installed with a cart POS program P1, the electronic device 40 operates as an information terminal corresponding to the cart POS system, by the function realized by the cart POS program P1.

The cart POS program P1 controls the processor 41 so that the electronic device 40 becomes an information terminal corresponding to a self-registration system. The cart POS program P1 is stored in the auxiliary storage device 43. In addition, the auxiliary storage device 43 has an area to store information of commodities and so on, along with the cart POS program P1. In addition, the cart POS program P1 receives the member ID issued in the store sever 10 as a result of the member registration (registration of member information) from the store sever 10, and manages (stores) it.

Figure 7:
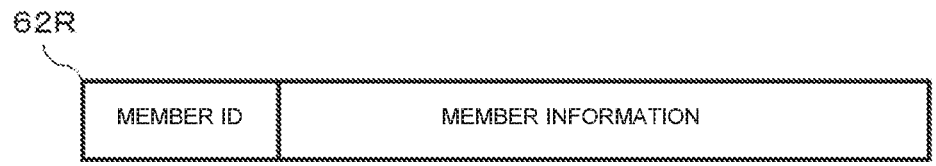
FIG. 7 is a schematic diagram showing a main data structure of the member data record to be registered in the member database of the store server according to the embodiment.

FIG. 7 is a schematic diagram showing a main data structure of the member data record 62R to be registered in the member database 62 of the store server 10. As shown in FIG. 7, the member data record 62R registers member information to be provided by a member in association with a member ID. The member ID includes the terminal ID of the electronic device 40 used for registration of a commodity, for example. The terminal ID of the electronic device 40 is generated based on the processing of the cart POS program P1 in the electronic device 40.

Figure 8:
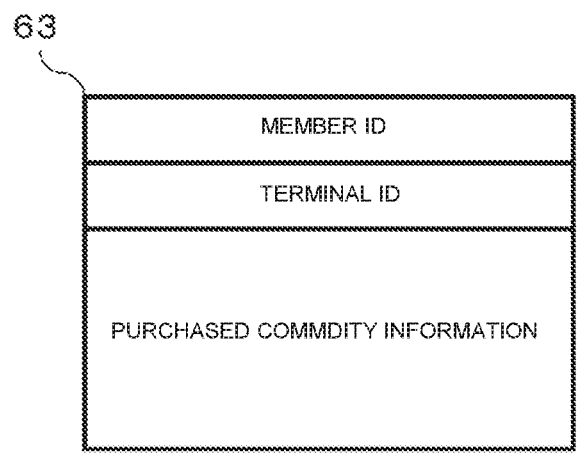
FIG. 8 is a schematic diagram showing a data structure in the shopping file of the store server according to the embodiment.

FIG. 8 is a schematic diagram showing a data structure in the shopping file 63 of the store server 10. As shown in FIG. 8, an area in which the member ID is to be described and an area in which the terminal ID is to be described are set, and an area in which purchased commodity information is to be described in association with the terminal ID associated with the member ID, in the shopping file 63. That is, the purchased commodity information is stored in the shopping file 63 in association with the terminal ID associated with the member ID. As described above, the terminal ID is the terminal ID (the first terminal identification data) unique to the information terminal 30 used for registration of the commodity information, or the terminal ID unique to the electronic device 40 (the second terminal identification data). The commodity information includes a commodity ID (identification data of a commodity), a commodity name, a price, and so on. The purchased commodity information is information of a commodity which the customer to be identified by the member ID (the identification data of the customer) purchases.

Figure 9:
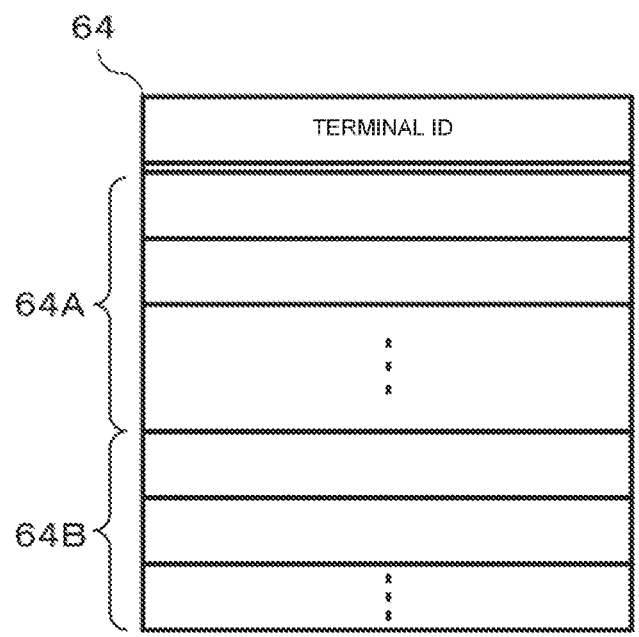
FIG. 9 is a schematic diagram showing a data structure in the terminal list of the store server according to the embodiment.

FIG. 9 is a schematic diagram showing a data structure in the terminal list 64 of the store server 10. Terminal IDs of the information terminal 30 and the electronic device 40 which are to be used for inputting information of a commodity which a customer purchases in the store are registered in the terminal list 64. As shown in FIG. 9, a terminal ID 64A unique to the existing information terminal 30 which has been set to the information terminal 30, and an additional terminal ID 64B which has been set temporarily in response to the registration request from the electronic device 40 are included in the terminal list 64.

Next, an operation of the store system 1 (the cart POS system) in the present embodiment will be described. Here, an operation of the store system 1 when a customer oneself performs from information input of a commodity which the customer purchases to accounting, using the electronic device 40 in place of the information terminal 30.

Figure 10:
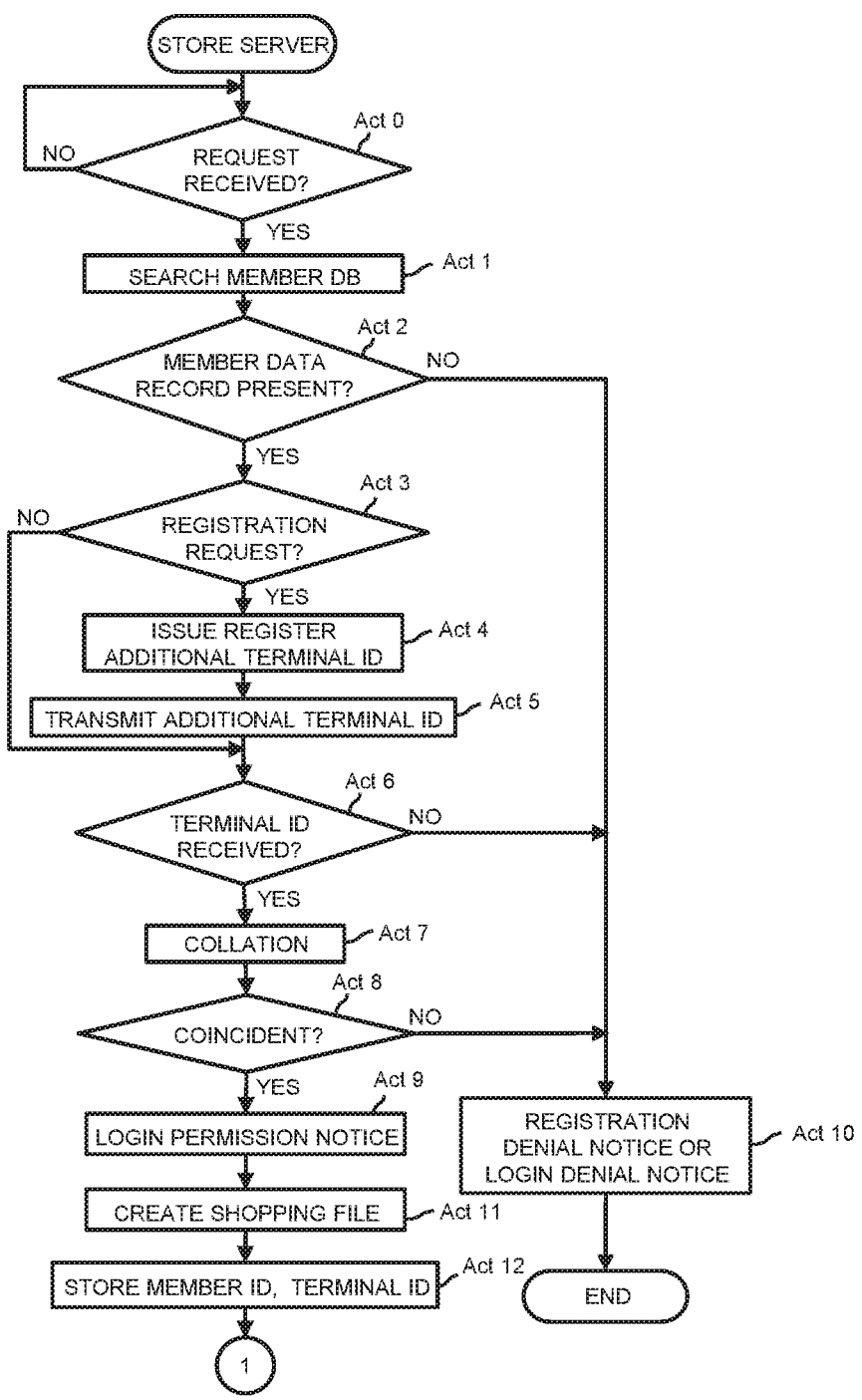
FIG. 10 is a flow chart showing a control processing of the store server in the present embodiment.
Figure 11:
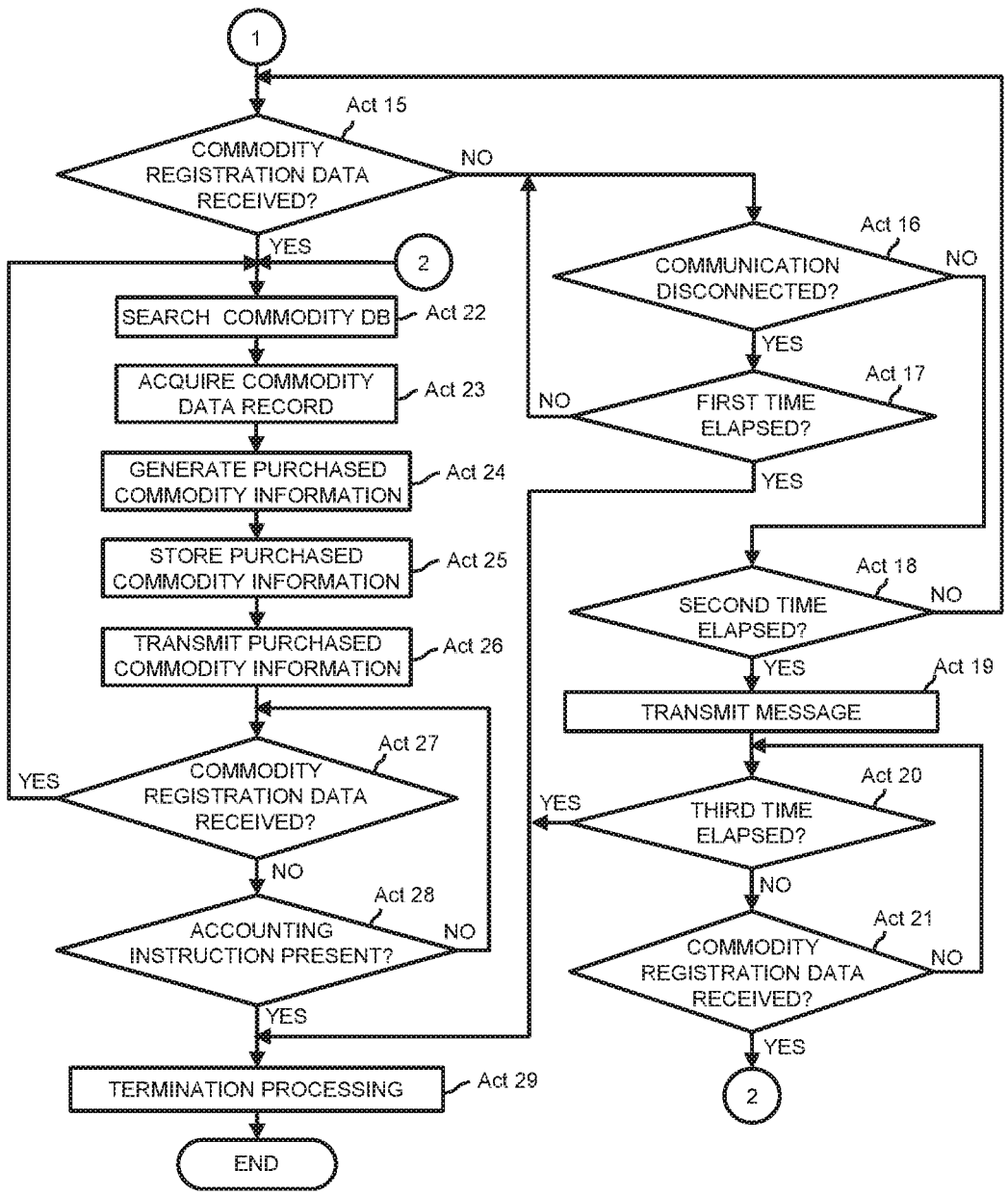
FIG. 11 is a flow chart showing a control processing of the store server in the present embodiment.
Figure 12:
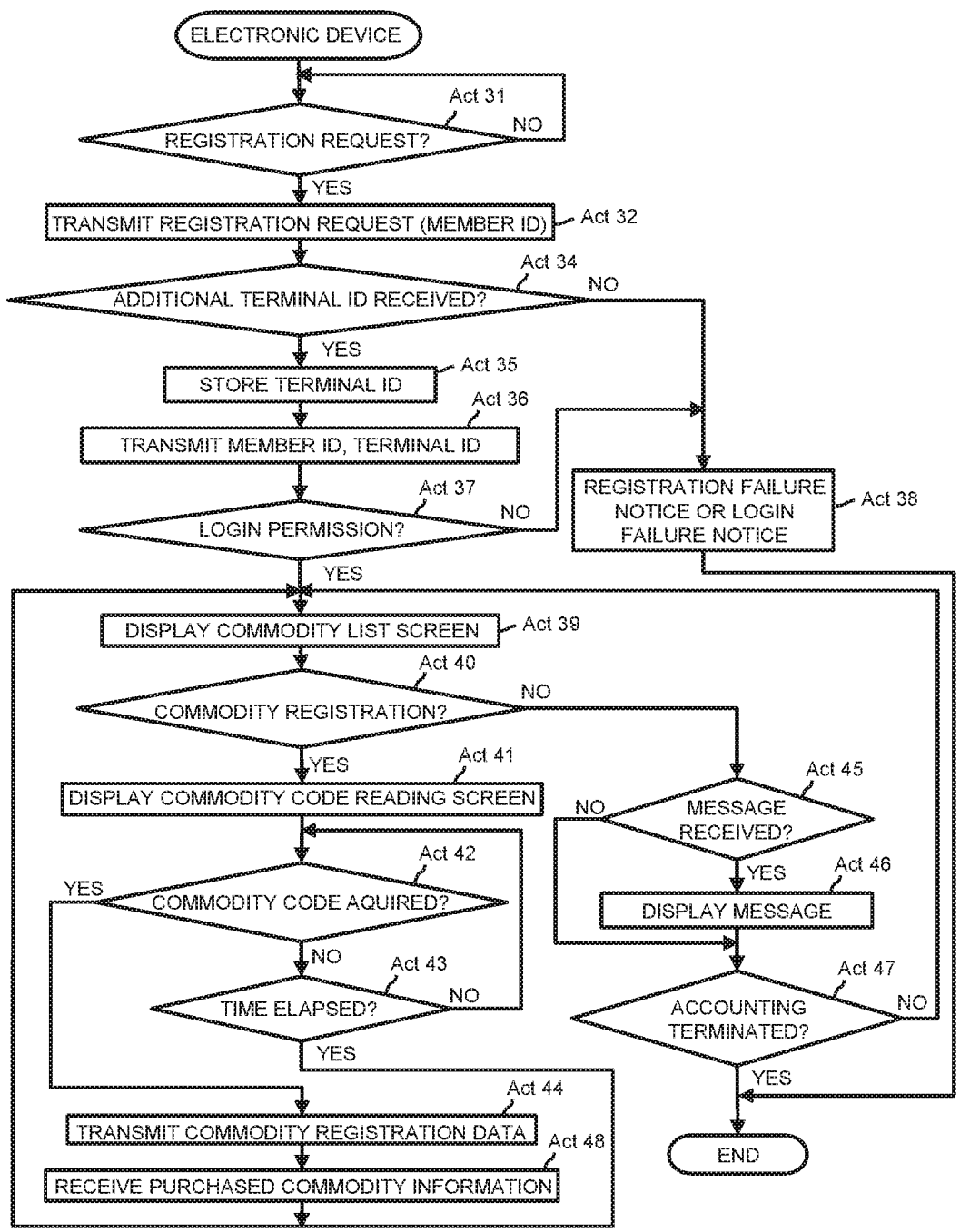
FIG. 12 is a flow chart showing a control processing of the electronic device in the present embodiment.

FIG. 10 and FIG. 11 are flow charts each showing an operation of the store server 10 (the processor 11) in the present embodiment. FIG. 12 is a flow chart showing an operation of the electronic device 40 (the processor 41) in the present embodiment. In addition, the operation shown in FIG. 10-FIG. 12 is an example, and if the similar effect can be obtained, processing procedure and processing content thereof are not particularly limited to this.

To begin with, a case in which a customer registers information of a commodity using the information terminal 30 will be described.

To begin with, when visiting a store, a customer secures an unused cart C. And the customer makes data of the own member card to be read by the reader 37 provided on the cart C. When detecting that the data of the member card has been read by the reader 37, the processor 31 of the information terminal 30 controls the wireless unit 34 so as to transmit a login permission request along with the data of the member card and the terminal ID to the store server 10. By this control, the data of the member card, the terminal ID, and the login permission request are wirelessly transmitted from the wireless unit 34. That is, the data of the member card and the terminal ID, and the login permission request which are to be wirelessly transmitted are received by the access point 50, and are sent to the store sever 10 via the network 60. The member ID that is identification data of the customer to use the cart C is included in the data of the member card.

The processor 11 of the store server 10 waits for the member ID to be received via the communication unit 14, in Act0 of FIG. 10 (NO in Act0). When a request has been received from the information terminal 30 (or the electronic device 40) via the communication unit 14, the processor 11 confirms whether the member ID along with this request have been received. When the processor 11 confirms that the member ID has been received (YES in Act0), the processing of the processor 11 proceeds to Act1. In Act1, the processor 11 describes the member ID in the work area of the main memory 12 (refer to FIG. 4). And the processor 11 searches the member database 62 using the above-described received member ID as a key for search. Next, in Act2, the processor 11 determines the presence or absence of the member data record 62R (refer to FIG. 7) in which the member ID that is the key for search is described in the member database 62, based on the above-described search result.

When the processor 11 determines that the member data record 62R in which the member ID that is the key for search is described is present in the member database 62 (YES in Act2), the processing of the processor 11 proceeds to Act3. In Act3, the processor 11 determines whether or not the above-described received request (refer to Act0) is a registration request from the electronic device 40. When the processor 11 determines that the above-described received request is not the registration request from the electronic device 40, but a login permission request from the information terminal 30, for example (NO in Act3), the processing of the processor 11 proceeds to Act6. That is, the processor 11 does not execute processings of Act4 and Act5. The processings of Act4 and Act5 are processings which are to be executed when the request received in Act0 is the registration request from the electronic device 40. Next, in Act6 in the case in which the request received in the above-described Act0 is the login permission request from the information terminal 30 as described above, the processor 11 determines whether the terminal ID have been received along with the login permission request. When the processor 11 determines that the terminal ID have been received along with the login permission request (YES in Act6), the processing of the processor 11 proceeds to Act7. In Act7, the processor 11 describes the terminal ID in the work area of the main memory 12 (refer to FIG. 4). And the processor 11 collates whether the terminal ID is registered in the terminal list 64 (refer to FIG. 4 and FIG. 9).

Next, in Act8, the processor 11 determines whether the terminal ID coincident with the terminal ID received along with the above-described login permission request is registered in the terminal list 64, based on the above-described collation result. When the processor 11 determines that the terminal ID coincident with the terminal ID received along with the above-described login permission request is registered in the terminal list 64 (YES in Act8), the processing of the processor 11 proceeds to Act9. In Act9, the processor 11 controls the communication unit 14 so as to transmit a response signal of a login permission notice, to the information terminal 30 that is the transmission source of the login permission request. By this control, the response signal of the login permission notice is transmitted from the communication unit 14 to the information terminal 30 as a destination. The response signal of the login permission notice is sent to the access point 50 via the network 60, and is wirelessly transmitted from the access point 50. The wirelessly transmitted response signal of the login permission notice is received by the wireless unit 34 of the information terminal 30.

The information terminal 30 which has received the response signal of the login permission notice becomes in a state capable of performing registration of the commodity information by an operation of the customer. The registration of the commodity information will be described later.

In addition, after having made the communication unit 14 transmit the response signal of the login permission notice, the processor 11 of the store server 10 creates, in Act11, the shopping file 63 in which the area in which the member ID is to be described and the area in which the terminal ID is to be described have been set as shown in FIG. 8, in the auxiliary storage device 13. Next, in Act12, the processor 11 makes the member ID (refer to Act1) and the terminal ID (refer to Act7) which have been described in the work area of the main memory 12 to be stored in the shopping file 63. That is, the processor 11 creates the shopping file 63 (refer to FIG. 8) in association with the terminal ID, and also in association with the member ID, and stores the created shopping file 63 in the auxiliary storage device 13. After having created the shopping file 63, the processor 11 registers the purchased commodity information in the shopping file 63, in association with the member ID and the terminal ID, based on the commodity registration data to be received from the information terminal 30, as described later.

In addition, the member database 62 has been searched based on the member ID received along with the login permission request in Act1, and when the processor 11 determines that the member data record 62R in which the member ID that is the key for search is described is not present in the member database 62 (NO in Act2), the processing of the processor 11 proceeds to Act10. Similarly, when the processor 11 determines that the terminal ID have not been received along with the login permission request (NO in Act6), the processing of the processor 11 proceeds to Act10. In addition, similarly, when the processor 11 determines that the terminal ID coincident with the terminal ID received along with the above-described login permission request is not registered in the terminal list 64 (NO in Act8), the processing of the processor 11 proceeds to Act10. And in Act10, the processor 11 controls the communication unit 14 so as to transmit a response signal of a login denial notice to the information terminal 30 of the login permission request source.

Next, a case in which a customer registers information of a commodity using the electronic device 40 which the customer possesses will be described with reference to FIG. 12.

To begin with, a customer operates the electronic device 40 so as to start the cart POS program P1 installed in the electronic device 40. In Act31 of FIG. 12, the processor 41 starts the cart POS program P1 in response to an operation of the customer, and becomes in a waiting state waiting for an input operation (NO in Act31).

Here, transmission of a registration request is instructed by the customer so as to use the electronic device 40 for registration of commodity information (YES in Act31), the processing of the processor 41 proceeds to Act32. In Act32, the processor 41 controls the wireless unit 46 so as to transmit the registration request along with the member ID to the store server 10, in accordance with the processing of the cart POS program P1. By this control, the registration request along with the member ID are wirelessly transmitted from the wireless unit 46. The member ID and the registration request which have been wirelessly transmitted are received by the access point 50, and are sent from the access point 50 to the store server 10 via the network 60.

In contrast, in FIG. 10, when receiving the request via the communication unit 14, as described above, the processor 11 of the tore server 10 confirms whether the member ID along with this request have been received. When the processor 11 confirms that the member ID has been received (YES in Act0 of FIG. 10), the processing of the processor 11 proceeds to Act1. In Act1, the processor 11 describes the member ID received along with the above-described request in the work area of the main memory 12. And the processor 11 searches the member database 62 using the member ID as the key for search. Next, in Act2, the processor 11 determines the presence or absence of the member data record 62R (refer to FIG. 7) in which the member ID that is the key for search is described in the member database 62, based on the above-described search result.

When the processor 11 determines that the member data record 62R in which the member ID that is the key for search is described is present in the member database 62 (YES in Act2), the processing of the processor 11 proceeds to Act3. In Act3, the processor 11 determines whether or not the above-described received request (refer to Act0) is a registration request from the electronic device 40. When the processor 11 determines that the above-described received request is the registration request from the electronic device 40 (YES in Act3), the processing of the processor 11 proceeds to Act4.

In Act4, the processor 11 issues an additional terminal ID to be assigned to the electronic device 40 of a registration request source, and additionally registers the additional terminal ID in the terminal list 64. The additional terminal ID shall be a unique one which does not overlap with the existing terminal ID assigned to the information terminal 30. Next, in Act5, the processor 11 controls the communication unit 14 so as to transmit the additional terminal ID to the electronic device 40 of the registration request source. By this control, the additional terminal ID is transmitted from the communication unit 14 to the electronic device 40 as a destination.

In contrast, in Act34 of FIG. 12, the processor 41 of the electronic device 40 determines whether the additional terminal ID from the store server 10 has been received by the wireless unit 46, or a registration denial notice from the store server 10 has been received by the wireless unit 46. When the processor 41 determines that the additional terminal ID from the store server 10 has been received by the wireless unit 46 (YES in Act34), the processing of the processor 41 proceeds to Act35. In Act35, the processor 41 makes the additional ID to be stored in the auxiliary storage device 43, for example. And in Act36, the processor 41 controls the wireless unit 46 so as to transmit the login permission request along with the additional terminal ID issued by the store server 10 and the member ID to the store server 10.

In contrast, when receiving the login permission request from the electronic device 40 via the communication unit 14 in FIG. 10, the processor 11 of the store server 10 executes the same processing (the processings of Act0 to Act3, and the processings of Act6 to Act9) as in the above-described case in which the login permission request has been received from the information terminal 30. That is, when the member data record 62R corresponding to the member ID received along with the login permission request from the electronic device 40 is registered in the member database 62, and the terminal ID is registered in the terminal list 64 (in this case, the additional terminal ID 64B), the processor 11 transmits the login permission notice to the electronic device 40 of the login permission request source.

That is, the additional terminal ID is issued by the store server 10, and thereby the electronic device 40 can transmit the same login permission request to the store server 10 as the information terminal 30 (refer to Act36). In addition, the store sever 10 can process the login permission request from the electronic device 40 in the same manner as the login permission request from the information terminal 30.

In addition, in FIG. 10, when determining that the member data record 62R in which the member ID that is the key for search is described is not present in the member database 62, in response to the registration request from the electronic device 40 (NO in Act2), the processor 11 transmits a response signal of a registration denial notice to the electronic device 40 of the registration request source (Act10). In addition, when determining that the member data record 62R in which the member ID that is the key for search is described is not present in the member database 62, in response to the login permission request from the electronic device 40, in the same manner as in the case of the above-described login permission request of the information terminal 30, (NO in Act2), the processor 11 transmits a response signal of a login denial notice to the electronic device 40 of the login permission request source (Act10). Similarly, when determining that the terminal ID along with the login permission request have not been received (NO in Act6), the processor 11 transmits the response signal of the login denial notice to the electronic device 40 of the login permission request source (Act10). In addition, similarly, when determining that the terminal ID coincident with the terminal ID received along with the above-described login permission request is not registered in the terminal list 64 (NO in Act8), the processor 11 transmits the response signal of the login denial notice to the electronic device 40 of the login permission request source (Act10).

After having made the additional terminal ID, the member ID and the login permission request to be transmitted to the store server 10 by the wireless unit 46, the processor 41 determines whether the login permission notice has been received or the login denial notice has been received from the store server 10, in Act37 of FIG. 12. And when the processor 41 determines that the login permission notice is received from the store server 10 (YES in Act37), the processing of the processor 41 proceeds to Act39. In addition, when the processor 41 determines that the additional terminal ID from the store server 10 in response to the registration request has not been received and the registration denial notice has been received (NO in Act34), the processing of the processor 41 proceeds to Act38. And when the processor 41 determines that the login denial notice has been received from the store server 10 (NO in Act37), the processing of the processor 41 proceeds to Act38. And, in Act38, the processor 41 outputs a registration failure notice or a login failure notice on the touch panel 44, for example. Each of the registration failure notice and the login failure notice is a message to notify that registration of commodity information using the electronic device 40 cannot be performed to the customer, such as a message "You cannot perform registration of a commodity using this device. Please use an information terminal of a cart.", and is displayed on the touch panel 44. In addition, the electronic device 40 may output the above-described message by voice.

On the other hand, in FIG. 12, when the processor 41 determines that the login permission notice has been received from the store server 10 (YES in Act37), the processor 41 makes a commodity list screen SC1 (refer to FIG. 13) to be displayed on the touch panel 44, in Act39. Next, in Act40 described later, the processor 41 becomes in a state for waiting an input operation for commodity registration by a customer. In addition, in this waiting state, the processor 41 makes a message for notifying that the electronic device 40 has transferred into an operation state capable of performing commodity registration to be displayed on the touch panel 44. For example, the processor 41 makes a message such as "You have succeeded in login authentication. Please start shopping." to be displayed on the touch panel 44. In addition, the electronic device 40 may output the above-described message by voice.

In addition, in FIG. 10, after having transmitted the login permission notice, the store server 10 executes the similar processings to the information terminal 30 and the electronic device 40 to which the login permission notice has been transmitted. That is, the processings of Act11 and later of the processor 11 are common processings to the information terminal 30 and the electronic device 40. In addition, the information terminal 30 and the electronic device 40 which have received the login permission notice execute the common processings with respect to the registration processing of the commodity information. In the following description, the processings between the store server 10 and the electronic device 40 will be described, and the description with respect to the information terminal 30 will be omitted.

When the commodity list screen SC1, and the message for notifying that the electronic device 40 has transferred in the operable state capable of performing commodity registration are displayed on the touch panel 44, as described above, (refer to Act39), the customer confirms that the electronic device 40 has started, and starts shopping. The processor 41 of the electronic device 40 makes the commodity list screen SC1 shown in FIG. 13, for example, to be displayed on the touch panel 44. In addition, the commodity list screen SC1 shown in FIG. 13 shows an example in which several commodities have been registered already, and commodity information is not displayed in the commodity list screen SC1 in the initial state.

Figure 13:
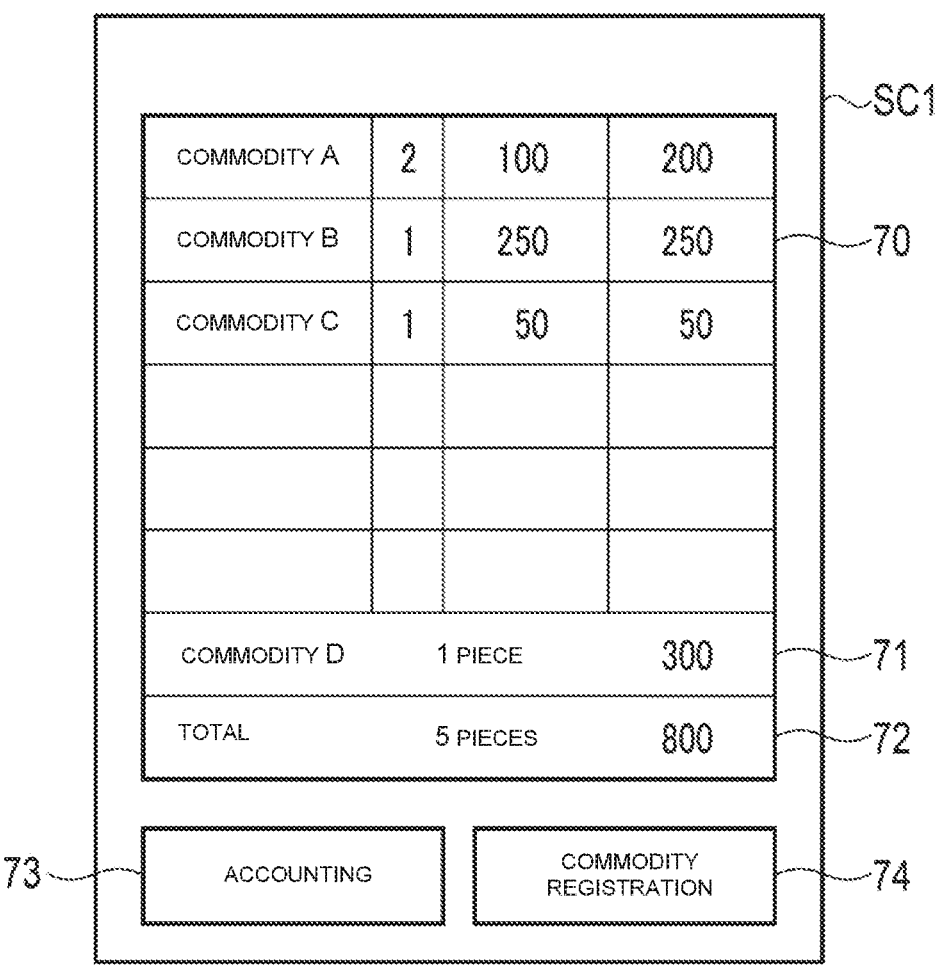
FIG. 13 is a diagram showing an example of a commodity list screen according to the embodiment.

As shown in FIG. 13, the commodity list screen SC1 includes a registered commodity list area 70, a registration object commodity area 71, a total display area 72, an accounting button 73, a commodity registration button 74, and so on. The registered commodity list area 70 is an area for displaying a list of a commodity name, a number, a unit price and a money amount with respect to a registered commodity. The registration object commodity area 71 is an area for displaying a commodity name, a number of finally registered commodities, and a total money amount of the relevant commodities (commodity D). The total display area 72 is an area for displaying a total number and a total money amount of the registered commodities (commodity A, B, C, D).

The accounting button 73 is a button for notifying that the commodity registration is finished and the processing transfers to the accounting processing, to the store server 10. The commodity registration button 74 is a button for instructing transfer to a commodity registration mode.

In addition, the commodity list screen SC1 of FIG. 13 shows only a basic form for displaying various information related to the registered commodities, and it is also possible to display various information related to the commodity registration other than those shown in FIG. 13.

In the above-described Act40 (FIG. 12), the processor 41 further determines whether or not an operation to the commodity registration button 74 has been detected by the touch panel 44. When the processor 41 determines that the operation to the commodity registration button 74 has been detected by the touch panel 44 (YES in Act40), the processing of the processor 41 proceeds to Act41. In Act41, the processor 41 makes the camera unit 45 start, and makes a code symbol reading screen SC2 for acquiring commodity information, in place of the commodity list screen SC1, to be displayed on the touch panel 44.

Figure 14:
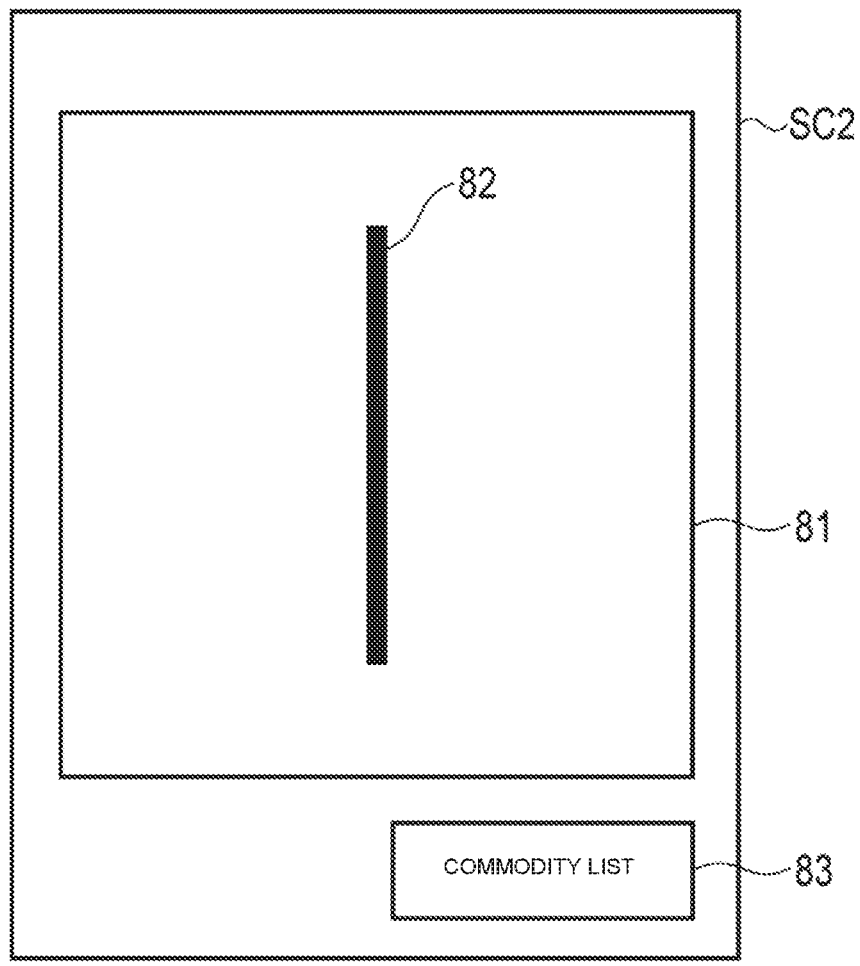
FIG. 14 is a diagram showing an example of a code symbol reading screen according to the embodiment.

FIG. 14 is a diagram showing an example of the code symbol reading screen SC2. The code symbol reading screen SC2 has an image display area 81 and a commodity list button 83. The image display area 81 is an area to display an image to be photographed by the camera unit 45, and displays a line 82 indicating a bar code reading position. The commodity list button 83 is a button for stopping acquisition of the commodity information and instructing to display the commodity list screen SC1. The code symbol reading screen SC2 displays a message that "please align the bar code with the line", for example. By this means, the customer can easily grasp a registration operation of the commodity information using the code symbol reading screen SC2.

When finding a commodity to be purchased at the sales floor, the customer photographs a code symbol such as a bar code attached to the commodity by the camera unit 45 of the electronic device 40. An image photographed by the camera unit 45 is displayed in the image display area 81. The customer adjusts the display range so that the code symbol (the bar code, and so on) is displayed at the position of the line 82.

The processor 41 of the electronic device 40 extracts the code symbol from the image photographed by the camera unit 45 to acquire the commodity ID (the identification data of the commodity) unique to the commodity which the code symbol indicates, for example. Specifically, in Act42 of FIG. 12, the processor 41 determines whether or not the commodity ID has been able to be acquired from the image photographed by the camera unit 45. And when the processor 41 determines that the commodity ID has not been able to be acquired (NO in Act42), the processing of the processor 41 proceeds to Act43. In Act43, the processor 41 determines whether a prescribed time has elapsed, and when the processor 41 determines that the prescribed time has not elapsed (NO in Act43), the processing of the processor 41 returns to Act42, again. In addition, when the processor 41 determines that the prescribed time has elapsed (YES in Act43), the processing of the processor 41 returns to Act39. In Act43, the processor 41 waits until the prescribed time elapses. After the elapse of the prescribed time, the processing of the processor 41 returns to Act39. On the other hand, when the processor 41 determines that the commodity ID has been able to be acquired from the image photographed by the camera unit 45 (YES in Act42), the processing of the processor 41 proceeds to Act44. In Act44, the processor 41 controls the wireless unit 46 so as to transmit the commodity registration data including the commodity ID, and the member ID which has been used in the login permission request to the store server 10. By this control, the commodity registration data including the commodity ID is wirelessly transmitted from the wireless unit 46. The wirelessly transmitted commodity registration data is received by the access point 50 and is sent to the store server 10 via the network 60.

On the other hand, the processor 11 of the store server 10 waits for the commodity registration data (the initial commodity registration data) to be received in Act15 of FIG. 11.

That is, in Act15, the processor 11 determines whether the data received via the communication unit 14 is the commodity registration data. When the processor 11 determines that the data received via the communication unit 14 is the commodity registration data (YES in Act15), the processing of the processor 11 proceeds to Act22. In Act22, the processor 11 makes the commodity ID and the member ID included in the commodity registration data to be stored in the work area of the main memory 12. And the processor 11 searches the commodity database 61 using the commodity ID stored in the work area as a key for search. Next, in Act23, the processor acquires a commodity data record corresponding to the commodity ID that is the key for search from the commodity database 61.

Next, in Act24, the processor 11 generates purchased commodity information based on the commodity ID, the commodity name, the price, and so on which are stored in the commodity data record corresponding to the commodity ID that is the key for search. In Act25, the processor 11 detects the shopping file 63 including the member ID stored in the work area from the auxiliary storage device 13, and resisters the above-described generated purchased commodity information in the detected shopping file 63.

In Act26, the processor 11 controls the communication unit 14 so as to transmit the above-described registered purchased commodity information. By this control, the purchased commodity information is transmitted from the communication unit 14 to the electronic device 40 that is the transmission source of the above-described received commodity registration data as a destination. When the purchased commodity information is transmitted as described above, the processor 11 determines whether further commodity registration data has been received from the electronic device 40 in Act27. When the processor 11 determines that the commodity registration data has not been received (NO in Act27), the processing of the processor 11 proceeds to Act28. In Act28, the processor 11 determines whether an accounting instruction command described later has been received from the electronic device 40. And when the processor 11 determines that the accounting instruction command has not been received (NO in Act28), the processing of the processor 11 returns to Act27. That is, when the purchased commodity information has been transmitted as described above, the processor 11 becomes in a waiting state waiting for the further commodity registration data or the accounting instruction command from the electronic device 40. In addition, the purchased commodity information is sent to the access point 50 via the network 60, and is wirelessly transmitted from the access point 50. The wirelessly transmitted purchased commodity information is received by the wireless unit 46 of the electronic device 40.

That is, in Act48 of FIG. 12, the processor 41 of the electronic device 40 receives the purchased commodity information via the wireless unit 46. When the purchased commodity information has been received, the processing of the processor 11 returns to Act39. In Act39, the processor 41 switches the display of the touch panel 44 from the code symbol reading screen SC2 to the commodity list screen SC1. And the processor 41 updates displays of the registered commodity list area 70, the registration object commodity area 71, the total display area 72 in the commodity list screen SC1, based on the commodity name, the price, and so on included in the above-described received purchased commodity information.

The customer looks at the commodity list screen SC1 updated as described above, confirms that the commodity name, the price and so on, of the commodity to be identified by the commodity ID indicated by the code symbol (the bar code or the like) photographed by the camera unit 45 are displayed on the touch panel 44, and continues shopping. And when newly finding a commodity to be purchased at the sales floor, the customer photographs a code symbol of the relevant newly found commodity by the camera unit 45, in order to input a commodity ID of the newly found commodity to the electronic device 40. That is, the processor 41 determines that an operation to the commodity registration button 74 has been detected by the touch panel 44 (YES in Act40). The processor 41 makes the code symbol reading screen SC2 for acquiring the commodity ID (the identification data of the commodity) to be displayed, in place of the commodity list screen SC1, on the touch panel 44, as described above (Act41). The customer adjusts the display range so that the code symbol (the bar code, and so on) of the image photographed by the camera unit 45 is displayed at the position of the line 82 of the image display area 81. The processor 41 extracts the code symbol of the above-described newly found commodity, from the image photographed by the camera unit 45, and acquires the commodity ID which the code symbol indicates (YES in Act42). And the processor 41 controls the wireless unit 46 so as to transmit the commodity registration data including the above-described acquired commodity ID to the store server 10, as described above (Act44). By this control, the commodity registration data of the above-described newly found commodity is wirelessly transmitted from the wireless unit 46.

In contrast, when the commodity registration data has been received from the electronic device 40 (YES in Act27 of FIG. 11), the processor 11 of the store server 10 generates the purchased commodity information based on the commodity ID as described above, and transmits it to the electronic device 40 (Act22 to Act26).

Each time the customer finds a commodity to be purchased at the sales floor, the customer repeats an operation to photograph a code symbol (a bar code, and so on) of the relevant found commodity by the camera unit 45, in order to input a commodity ID of the found commodity to the electronic device 40. And when having finished shopping at the sales floor, the customer touches the accounting button 73 (refer to FIG. 13) of the commodity list screen SC1 which is displayed on the touch panel 44. Meanwhile, in Act40, the processor 41 of the electronic device 40 firstly determines whether or not the operation to the commodity registration button 74 has been detected by the touch panel 44, as described above. In this case, since the accounting button 73 has been touched by the customer, the processor 41 determines that the operation to the commodity registration button 74 has not been detected by the touch panel 44 (NO in Act40). Next, in Act45, whether a remainder message has been received is determined. In this case, since the accounting button 73 has been touched similarly by the customer, the processor 41 determines that the remainder message has not been received (NO in Act45). And the processing of the processor 41 proceeds to Act47. In Act47, the processor 41 determines whether the operation to the accounting button 73 has been detected by the touch panel 44. When the processor 41 determines that the operation to the accounting button 73 has been detected by the touch panel 44 (YES in Act47), the processor 41 controls the wireless unit 46 so as to transmit the accounting instruction command to the store server 10, and then finishes the processing. By the above-described control, the accounting instruction command is wirelessly transmitted from the wireless unit 46. The accounting instruction command includes the member ID at the time of the login permission request. In addition, when the processor 41 determines that the operation to the accounting button 73 has not been detected by the touch panel 44 (NO in Act47). The processing of the processor 41 returns to Act39.

In contrast, when the processor 11 of the store server 10 determines that the accounting instruction command has been received (YES in Act28 of FIG. 11), the processing of the processor 11 proceeds to Act29. In Act29, the processor 11 executes a termination processing to the shopping file 63 in which the member ID included in the accounting instruction command is set, and thereby makes the shopping file 63 in a state of an accounting processing object in the accounting machine 20.

In addition, regarding the electronic device 40 which has normally finished registration of the commodity information, the additional terminal ID registered in the terminal list 64 may be enabled until the accounting processing is finished. That is, after the registration termination has been instructed by the operation of the accounting button 73 by the customer, the processing of the electronic device 40 may be returned to the registration of the commodity information again.

In addition, when the processor 11 determines that the data received via the communication unit 14 is not the commodity registration data (NO in Act15 of FIG. 11), the processing of the processor 11 proceeds to Act16. In Act16, the processor 11 of the store server 10 detects whether the communication with the electronic device 40 to which the login permission notice has been transmitted is in a disconnected state. When the processor 11 detects that the communication with the electronic device 40 to which the login permission notice has been transmitted is in the disconnected state (YES in Act16), the processing of the processor 11 proceeds to Act17. In Act17, the processor 11 determines whether a predetermined time (a first time) has elapsed after that the communication is in the above-described disconnected state was determined, to monitor a communication state with the electronic device 40 to which the login permission notice has been transmitted (NO in Act17). When a state in which the wireless communication cannot be performed between the electronic device 40 and the access point 50 continues for not less than a fixed time (the first time), as a result of the movement of the customer possessing the electronic device 40, when the processor 11 determines that the above-described first time has elapsed (YES in Act17), the processing of the processor 11 proceeds to Act29. In this case, in the above-described Act29, the processor 11 executes the termination processing for stopping the commodity registration by the electronic device 40. For example, the processor 11 deletes the additional terminal ID assigned to the electronic device 40 which has been registered in the terminal list 64, and deletes the shopping file in which the deleted terminal ID has been set.

In addition, even when the disconnected state in which wireless communication cannot be performed occurs, when the communication state returns to the communication capable state before the fixed time (the first time) has elapsed, the electronic device 40 can continue to perform the commodity registration continuously.

In addition, when the processor 11 detects that the communication with the electronic device 40 to which the login permission notice has been transmitted is not in a disconnected state (NO in Act16), the processing of the processor 11 proceeds to Act18. In Act18, the processor 11 determines whether a predetermined time (a second time) has elapsed after judging that the above-described commodity registration data has not been received (NO in Act15), to monitor whether the above-described commodity registration data has been received within the above-described second time (NO in Act18). And when the processor 11 determines that the above-described second time has elapsed, that is, when the commodity registration data has not been received after the above-described second time has elapsed (YES in Act18), the processing of the processor 11 proceeds to Act19. In Act19, the processor 11 controls the communication unit 14 so as to transmit a remainder message to urge to execute acquisition of the commodity information by photographing the code symbol of the commodity to the electronic device 40. By this control, the above-described remainder message is transmitted from the communication unit 14 to the electronic device 40.

In contrast, the processor 41 of the electronic device 40 receives the remainder message from the store server 10 (YES in Act45). And the processing of the processor 41 proceeds to Act46. In Act46, the processor 41 makes the message to urge to execute acquisition of the commodity information by photographing the code symbol of the commodity, such as a message that "please read a code of a commodity", for example, to be displayed on the touch panel 44. In addition, the electronic device 40 may output the above-described message by voice.

On the other hand, the processor 11 of the store server 10 further monitors whether a predetermined time (a third time) has elapsed after having transmitted the above-described remainder message to urge to execute acquisition of the commodity information by photographing the code symbol of the commodity to the electronic device 40. Specifically, the processor 11 determines whether the third time has elapsed in Act20, and when the processor 11 determines that the third time has not elapsed (NO in Act20), the processor 11 further determines whether the commodity registration data (the initial commodity registration data) has been received in Act21. And when the processor 11 determines that the commodity registration data has not been received (NO in Act21), the processing of the processor 11 returns to Act20. When the commodity registration data has not been received even when the third time has elapsed, the processor 11 executes the termination processing for stopping the commodity registration by the electronic device 40 (Act29), in the same manner as described above (refer to YES in Act17). Specifically, when the processor 11 determines that the commodity registration data has not been received (NO in Act21) and determines that the third time has elapsed (YES in Act20), the processor 11 performs the processing of the above-described Act29.

On the other hand, when determining that the commodity registration data has been received from the electronic device 40 (YES in Act21), the processor 11 generates the purchased commodity information based on the commodity ID as described above, and transmits it to the electronic device 40 (Act22 to Act26).

In this manner, when a case in which the electronic device 40 to which the additional terminal ID has been issued is not normally used for registration of the commodity information is detected (YES in Act17, YES in Act20), it is possible to invalidate the additional terminal ID (Act29). By this means, in a case in which though the additional terminal ID of the electronic device 40 has been registered, in order to use the electronic device 40 for registration of the commodity information in the store, then the shopping has been stopped, for example, it is possible to release the electronic device 40 from the store system 1 without requiring the customer to perform a special operation.

In addition, the store server 10 may make the member ID corresponding to the additional terminal ID which has been invalidated before the commodity registration is completed to be stored in the auxiliary storage device 13 as a log. A manager of the store becomes able to take an action such as to describe a registration method of commodity information using the electronic device 40 to the customer which the member ID indicates, for example, based on the member ID recorded as the log.

On the other hand, when having normally finished registration of the commodity information by an operation of the accounting button 73, the customer moves to an installation place of the accounting machine 20 to perform accounting processing while holding the electronic device 40.

The human detecting sensor 29 of the accounting machine 20 is turned on when the customer comes close to it. When the human detecting sensor 29 is turned on, the processor 21 of the accounting machine 20 makes a request message for requesting input of the member ID and the terminal ID to be displayed on the touch panel 25.

In addition, regarding a method for making the accounting machine 20 read the terminal ID and the member ID, any method may be used. For example, the processor 41 of the electronic device 40 transmits data including the terminal ID and the member ID from the wireless unit 46 to the accounting machine 20, by the control of the cart POS program P1. In addition, the electronic device 40 transmits the accounting instruction command to the store server 10, and thereby receives an accounting bar code including the terminal ID and the member ID which is to be generated in the store server 10, from the store server 10. The customer who uses the electronic device 40 may make the accounting bar code to be read by a scanner (not shown) of the accounting machine 20 from the electronic device 40. Or, the customer who uses the electronic device 40 may make the data including the terminal ID and the member ID to be read by the reader/writer 27 of the accounting machine 20.

When having read the terminal ID and the member ID from the electronic device 40, the accounting machine 20 transmits a transmission request of the shopping file 63 that is an object of the accounting processing corresponding to the terminal ID and the member ID, to the store server 10. When confirming that the shopping file 63 corresponding to the terminal ID and the member ID designated by the transmission request of the shopping file 63 is present, the processor 11 of the store server 10 makes the communication unit 24 collectively transmit the purchased commodity information of the corresponding shopping file 63 to the accounting machine 20 of the transmission request source of the shopping file 63.

The processor 21 of the accounting machine 20 executes an accounting processing based on the purchased commodity information received from the store server 10. For example, the processor 21 makes the total money amount to be calculated based on the purchased commodity information to be displayed on the touch panel 25 of the accounting machine 20, and waits for payment of the price by the customer. When confirming that the price corresponding to the total money amount has been payed via the change machine 210, the processor 21 of the accounting machine 20 generates receipt data based on the purchased commodity information, and makes the printer 26 operate to issue a receipt. The accounting processing like this is a well-known processing to be performed in the existing accounting machine 20, and accordingly, the detailed description thereof will be omitted. Having finished the accounting processing, the processor 21 transmits an accounting termination command to the store server 10.

The processor 11 of the store server 10 which has controlled transmission of the purchased commodity information waits for the accounting termination command to be transmitted from the accounting machine 20 of the purchased commodity information transmission source. When detecting that the accounting termination command from the accounting machine 20 has been received via the communication unit 14, the processor 11 updates the shopping file 63 from which the purchased commodity information has been transmitted into the shopping file 63 in the state at the time of the accounting termination.

In this manner, according to the present embodiment, not the dedicated information terminal 30 attached to the cart C, but the electronic device 40 which the customer possesses is incorporated in the existing cart POS system, and thereby the customer can acquire commodity information using the electronic device 40 and perform the accounting processing thereof. Accordingly, when it is not necessary for the customer to use the cart C, for example, the customer can use the electronic device 40 owned by oneself in place of the information terminal 30 to perform shopping. By this means, when purchasing the commodity in the store, the customer is released from troublesome works, such as, concern of damage and return of the information terminal 30 (the cart C).

In addition, after the additional terminal ID has been assigned in response to the registration request from the electronic device 40 by the store server 10, the store system 1 treats the electronic device 40 similarly as the information terminal 30 to realize the cart POS system. Accordingly, significant increase in processing load to the store system 1 is not caused, in accordance with the utilization of the electronic device 40.

In addition, since the electronic device 40 which the customer possesses is used in the existing store system 1 (cart POS system), it is possible for the store side to reduce load of the management work such as theft prevention and maintenance of the information terminal 30 that is the dedicated device.

In addition, in the above-described description, the case in which the commodity information is registered using the one electronic device 40 which the customer possesses in place of the information terminal 30 has been described, but it is possible to use a plurality of the electronic devices 40 together, while the plurality of the electronic devices 40 are associated with each other.

For example, the processor 11 of the store server 10 issues the additional terminal ID in response to the registration request from the electronic device 40, and transmits the login permission notice in response to the permission request from the electronic device 40 to the electronic device 40, as described above. When transmitting the login permission notice to the electronic device 40, the processor 11 generates the shopping file 63 in which the member ID and the terminal ID (the additional terminal ID) received from the electronic device 40 are set. Then, when receiving the registration request along with the member ID from another electronic device 40, the processor 11 discriminates whether the shopping file 63 in which the received member ID has been set is already created. Here, when the shopping file 63 in which the same member ID has been set is already created, the processor 11 generates the shopping file 63 in which the additional terminal ID issued to the electronic device 40 which has transmitted the registration request later is associated with the member ID.

FIG. 15 shows an example in which the shopping files 63 corresponding to the three electronic devices 40 (terminal IDs (1) (2) (3)) are associated, for example. As shown in FIG. 15, a plurality of the terminal IDs (1), (2), (3) are associated with one member ID. The purchased commodity information to be generated when the commodity information is acquired in each of the electronic devices 40 is stored in the shopping file 63 in association with each of the terminal IDs (1), (2), (3).

For example, the accounting machine 20 may execute the accounting processing individually, with respect to each of a plurality of the electronic devices 40 corresponding to the respective terminal IDs (1), (2), (3). In addition, the accounting machine 20 may receive the purchased commodity informations corresponding to the respective terminal IDs (1), (2), (3) from the store server 10, and integrate the purchased commodity informations corresponding to the respective terminal IDs (1), (2), (3) to execute collectively the accounting processing of the integrated purchased commodity informations. In addition, the store server 10 may integrate the purchased commodity informations corresponding to the respective terminal IDs (1), (2), (3), and transmit the integrated purchased commodity informations to the accounting machine 20. By what method the accounting machine 20 executes the accounting processing may be able to be selected by an operation to the accounting machine 20 by the customer.

Since a plurality of the electronic devices 40 can be made to be used together in this manner, when a family visits the store for shopping, it becomes possible to register commodity information by each of a plurality of the electronic devices 40, using the member ID recorded in the one member card. In this case, the family members separate in the store, and can share execution of registration of the commodity informations.

In addition, in the above-described description, the example in which a plurality of the electronic devices 40 are associated and used together has been described, but the information terminal 30 and the electronic device 40 can be associated and used together, in the same manner as described above. In this case, the login permission request may be received firstly from any of the information terminal 30 or the electronic device 40.

In addition, in the above-described description, the case in which a plurality of the electronic devices 40, or the information terminal 30 and the electronic device 40 are associated based on the one member ID, and are used together has been described, but a plurality of the electronic devices 40, or the information terminal 30 and the electronic device 40, corresponding to the different member IDs and terminal IDs may be associated and used together.

For example, when performing the login permission notice in response to the login permission request from the information terminal 30 as described above, the processor 11 of the store server 10 generates the shopping file 63 in which the member ID and the terminal ID received from the information terminal 30 are set. In addition, when receiving the registration request along with the member ID from the electronic device 40, the processor 11 generates the additional terminal ID, transmits the login permission notice, and generates the shopping file 63 in which the member ID and the terminal ID (additional terminal ID received from the electronic device 40 are set, as described above.

Then, in accordance with an operation to the information terminal 30 by the customer, the information terminal 30 reads the member ID used in the registration request of the electronic device 40, and transmits an association request of the electronic device 40 along with this member ID to the store server 10.

The processor 11 of the store server 10 discriminates whether the shopping file 63 in which the member ID received along with the association request has been set is already created. Here, when the shopping file 63 in which the same member ID has been set is already created, the processor 11 associates the shopping file 63 created corresponding to the information terminal 30, with the shopping file 63 in which the member ID received along with the association request has been set.

FIG. 16 shows an example in which the shopping files 63 corresponding to the information terminal 30 (the terminal ID (1)) and the electronic device 40 (the terminal ID (2)) are associated, for example, and further the shopping file 63 corresponding to the electronic device 40 (the terminal ID (3)) are associated with them, in the same manner as FIG. 15. As shown in FIG. 16, the shopping files 63 corresponding to a plurality of the respective member IDs (1), (2) are associated. The purchased commodity informations to be generated when the commodity informations are acquired in the information terminal 30 and the respective electronic devices 40 are stored in the shopping files 63 in association with the terminal IDs (1), (2), (3), respectively.

In this case, the accounting machine 20 may execute the accounting processing individually, with respect to each of the information terminal 30 and the electronic devices 40 corresponding to the respective terminal IDs (1), (2), (3), in the same manner as the example shown in FIG. 15. In addition, the accounting machine 20 may receive the purchased commodity informations corresponding to the respective terminal IDs (1), (2), (3) from the store server 10, and integrate the purchased commodity informations corresponding to the respective terminal IDs (1), (2), (3) to execute collectively the accounting processing of the integrated purchased commodity informations. In addition, the store server 10 may integrate the purchased commodity informations corresponding to the respective terminal IDs (1), (2), (3), and transmit to the accounting machine 20. By what method the accounting machine 20 executes the accounting processing may be able to be selected by an operation to the accounting machine 20 by the customer.

In this manner, the association request with the electronic device 40 is performed through the information terminal 30, and thereby the information terminal 30 and the electronic device 40 which have been logged in can be associated and used together, using the different member IDs.

In the above-described embodiment, the store system 1 of a self system in which a customer oneself performs from information input of a commodity to be purchased to accounting has been exemplified, but the store system 1 is not limited to this. For example, the accounting machine 20 may be an accounting machine for a manned register to be processed by a salesclerk called a cashier.

In addition, assignment of the store server 10 is generally performed in a state in which a program is stored in a recording medium such as a ROM and an HDD. However, without being limited to this, the store server 10 may be assigned in a state in which a program is not stored in a recording medium. And in this case, a program assigned separately from the store server 10 is written into a writable storage device provided in the store server 10, in accordance with an operation of a user or the like. Assignment of a program is performed while the program is recorded in a removable recording medium, or performed by communication via a network. If the recording medium is a medium which can store a program such as a CD-ROM, a memory card, and is readable by the apparatus, the form thereof does not matter.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A store server to control an information terminal which is in a store and receives identification data for a commodity to be purchased by a customer in the store, the identification data being received from the information terminal or an electronic device which the customer possesses, comprising:
   a communication device which performs transmission/reception of information with the information terminal and the electronic device;
   a storage device storing a list of terminal identification data including first terminal identification data, which is unique to the information terminal, and second terminal identification data, which is unique to the electronic device, the second terminal identification data being issued when the customer requests the electronic device to be additionally registered, the storage device additionally storing a shopping file in which information of the commodity to be purchased can be registered in association with the first terminal identification data or the second terminal identification data; and
   a processor configured to:
   receive a registration request from the informational terminal or the electronic device via the communication device,
   when the received registration request includes terminal identification data, determine whether first terminal identification data registered in the list of terminal identification data matches the received terminal identification data,
   when the first terminal identification data matches the received terminal identification data, create a shopping file in association with the first terminal identification data,
   when the registration request does not include terminal identification data, determine that the source of the registration request is the electronic device, issue second terminal identification data to the electronic device, and register the issued second terminal identification data in the list of terminal identification data, and
   when the registration request including the issued second terminal identification data is received from the electronic device by the communication device, create a shopping file in association with the second terminal identification data.

2. The store server according to claim 1, wherein
   when different second terminal identification data is respectively received from a plurality of electronic devices via the communication device, the processor is configured to create a plurality of shopping files respectively corresponding to each of the different second terminal identification data.

3. The store server according to claim 2, wherein
   the processor further associates the shopping file associated with first terminal identification data to one of the shopping files associated with second terminal identification data based on a common customer identity associated with each of the first terminal identification data and the second terminal identification data.

4. The store server according to claim 3, wherein
   the processor is configured to collectively transmit the information of each of the shopping files associated with the common customer to an accounting machine for performing an accounting processing.

5. A store system, comprising:
   an information terminal provided in a store and configured to receive commodity identification data for identifying a commodity to be registered in a sales transaction of a customer in the store; and
   a store server configured to receive commodity identification from the information terminal and an electronic device which the customer possesses and can be used by the customer for inputting commodity identification data of a commodity to be registered in a sales transaction of the customer, wherein
   the store server includes:
   a communication device which performs transmission/reception of information with the information terminal and the electronic device;
   a storage device storing a list of terminal identification data including first terminal identification data, which is unique to the information terminal, and second terminal identification data, which is unique to the electronic device, the second terminal identification being issued when the customer requests the electronic device to be additionally registered in association with the information terminal, the storage device additionally storing a shopping file in which commodity identification data can be registered in association with the first terminal identification data or the second terminal identification data; and
   a processor configured to:
   receive a registration request from the informational terminal or the electronic device via the communication device,
   when the received registration request includes terminal identification data, determine whether first terminal identification data registered in the list of terminal identification data matches the received terminal identification data,
   when the first terminal identification data matches the received terminal identification data, create a shopping file in association with the first terminal identification data,
   when the registration request does not include terminal identification data, determine that the source of the registration request is the electronic device, issue second terminal identification data to the electronic device, and register the issued second terminal identification data in the list of terminal identification data, and
   when the registration request including the issued second terminal identification data is received from the electronic device by the communication device, create a shopping file in association with the second terminal identification data.

6. The store system according to claim 5, wherein
   when different second terminal identification data is respectively received from a plurality of electronic devices via the communication device, the processor is configured to create a plurality of shopping files respectively corresponding to each of the different second terminal identification data.

7. The store system according to claim 6, wherein the processor further associates the shopping file associated with first terminal identification data to one of the shopping files associated with second terminal identification data based on a common customer identity associated with each of the first terminal identification data and the second terminal identification data.

8. The store system according to claim 7, wherein the processor is configured to collectively transmit the information of each of the shopping files associated with the common customer to an accounting machine for performing an accounting processing.

9. The store system according to claim 5, wherein the processor is configured to create each shopping file in association with identification data of the customer.

10. A control method of a store server having a communication device which performs transmission/reception of information with an information terminal which is in the store and receives identification data for a commodity to be purchased by a customer in the store, the identification data being received from the information terminal or an electronic device which the customer possesses, and a storage device storing a list of terminal identification data including first terminal identification data, which is unique to the information terminal, and second terminal identification data, which is unique to the electronic device, the second terminal identification data being issued when the customer requests the electronic device to be additionally registered, the storage device additionally storing a shopping file in which information of the commodity to be purchased can be registered in association with the first terminal identification data or the second terminal identification data, the control method comprising:

receiving a registration request from the informational terminal or the electronic device via the communication device, when the received registration request includes terminal identification data, determining whether first terminal identification data registered in the list of terminal identification data matches the received terminal identification data, when the first terminal identification data matches the received terminal identification data, creating a shopping file in association with the first terminal identification data, when the registration request does not include terminal identification data, determining that the source of the registration request is the electronic device, issuing second terminal identification data to the electronic device and registering the issued second terminal identification data in the list of terminal identification data, and when the registration request including the issued second terminal identification data is received from the electronic device by the communication device, creating a shopping file in association with the second terminal identification data.

\* \* \* \* \*